(12) United States Patent
Uchiyama et al.

(10) Patent No.: US 6,334,615 B1
(45) Date of Patent: Jan. 1, 2002

(54) SEAL FOR ROLLING BEARING

(75) Inventors: Takahiko Uchiyama; Fumio Ueki; Magozou Hamamoto; Toshimi Takajo, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/042,559

(22) Filed: Mar. 17, 1998

(30) Foreign Application Priority Data

Mar. 18, 1997 (JP) .............................. 9-083370
Feb. 17, 1998 (JP) ............................ 10-050003

(51) Int. Cl.⁷ ................................ F16J 15/34
(52) U.S. Cl. ...................... 277/376; 277/570; 277/572; 277/922; 277/944
(58) Field of Search .................. 277/358, 376, 277/570, 549, 551, 922, 944; 384/482, 484

(56) References Cited

U.S. PATENT DOCUMENTS

| | | | | |
|---|---|---|---|---|
| 2,857,179 A | * | 9/1958 | Reising ....................... 277/376 |
| 3,400,989 A | * | 9/1968 | Dixon et al. ................ 277/376 |
| 3,650,874 A | * | 3/1972 | Job et al. ..................... 161/217 |
| 3,680,933 A | * | 8/1972 | Walker ..................... 308/187.1 |
| 3,758,643 A | * | 9/1973 | Fischer ................... 260/897 A |
| 3,806,558 A | * | 4/1974 | Fischer ................... 260/897 A |
| 3,904,470 A | * | 9/1975 | Fukuki et al. .............. 156/306 |
| 3,962,018 A | * | 6/1976 | Costemalle et al. ........ 156/306 |
| 5,002,625 A | * | 3/1991 | Naritomi et al. ............ 156/245 |
| 5,149,589 A | * | 9/1992 | Naritomi et al. ............ 428/412 |
| 5,383,728 A | * | 1/1995 | Micca et al. ................ 384/482 |
| 5,665,458 A | * | 9/1997 | Mahn, Jr. .................... 428/202 |
| 5,708,491 A | | 1/1998 | Onodera et al. ............ 351/122 |
| 5,753,063 A | * | 5/1998 | Sakakibara et al. ......... 156/219 |
| 5,910,540 A | * | 6/1999 | Takahashi ................. 525/92 B |

FOREIGN PATENT DOCUMENTS

| | | |
|---|---|---|
| GB | 1 412 263 | 10/1975 |
| GB | 1 514 025 | 6/1978 |
| GB | 2 144 184 | 2/1985 |
| GB | 2 156 917 | 10/1985 |
| GB | 2 192 953 | 1/1988 |
| JP | 2-208025 | 8/1990 |
| JP | 3-2015 | 9/1993 |
| JP | 6-134885 | 8/1994 |
| WO | WO 96/07526 | 3/1996 |

* cited by examiner

*Primary Examiner*—Anthony Knight
*Assistant Examiner*—Alison K. Pickard
(74) *Attorney, Agent, or Firm*—Crowell & Moring LLP

(57) ABSTRACT

The present invention provides a seal for rolling bearings having improved sealing properties, undergoing no separation between a core and a peripheral portion nor deformation even in long-term use. The seal comprises a flexible resin portion which comes into contact with an outer race and a rigid resin portion which is more rigid than the flexible resin portion, the rigid resin portion and the flexible resin portion being fusion bonded together into an integral body.

4 Claims, 25 Drawing Sheets

SEAL FOR ROLLING BEARING

FIELD OF THE INVENTION

The present invention relates to a seal for a rolling bearing, and specifically, a seal for a rolling bearing to be used as a closed seal for a rolling bearing.

BACKGROUND OF THE INVENTION

Rolling bearings, especially small-sized ones used in office equipment, etc., are sealed with a seal fit into an annular seal groove made in the fixed outer race in order to prevent a lubricant, such as grease, from leaking outside.

A seal for a rolling bearing is required to be rigid in its core portion so as to maintain its shape and be flexible in at least its outer peripheral portion which is to be fitted into the seal groove and also to maintain the sealing effect for an extended period of time without creep.

From this viewpoint, a seal comprising a core made of metal and the inner and outer peripheral parts, inclusive of the sealing part, made of rubber is well known in the art (hereinafter referred to as a first conventional technique). According to the first conventional technique, as shown in the flow chart of FIG. 23, a rubber material and prescribed compounding additives are weighed in weighing step 51 and kneaded in kneading step 52, and the compound is calendered in calendering step 53 to prepare an unvulcanized rubber sheet. On the other hand, a metal material is pressed in press working step 54 to prepare a metal core of prescribed shape, which is washed in washing step 55. A prescribed adhesive is applied to the metal core and baked in adhesive application step 56. The unvulcanized rubber sheet from the calendering step 53 and the metal core from the adhesive application step 56 are put in mold and formed into a prescribed shape to obtain a seal.

Seals of this type also include those made of synthetic resins. For example, JP-A-U-5-96549 (the term "JP-A-U" as used herein means an unexamined published Japanese utility model application) discloses a seal for rolling bearings shown in, FIG. 24, in which a central portion 58 on the inner side (the side facing rolling elements) is made of a reinforced resin plate having higher rigidity than a peripheral portion 59 comprising an inner peripheral portion 59a and an outer i peripheral portion 59b, and part of the inner peripheral portion 59a is made thinner so as to have greater flexibility than the outer peripheral portion 59b (hereinafter referred to as a second conventional technique). The seal of the second conventional technique is press-fit into the annular space formed between the outer and inner races by once deflecting the inner peripheral portion 59a outward and then pressing inward.

Another synthetic resin seal is disclosed in JP-A-6-313436 (the term "JP-A" as used herein means an unexamined published Japanese patent application), which is made up of peripheral portions 60 and 61 comprising a relatively soft resin and an intermediate resin portion 62 connecting the peripheral portions 60 and 61 and comprising a relatively hard material (hereinafter referred to as a third conventional. technique). The intermediate resin portion 62 made of at synthetic resin provides a rigid annular insert, and the peripheral portions 60 and 61 are made of a mixture comprising an elastomer and the same synthetic resin as used for the annular insert. The peripheral portions 60 and 61 and the annular insert are molded simultaneously.

However, the first conventional technique has poor productivity because of involvement of complicated production steps as explained above.

When the seal of the second conventional technique is press fit into a rolling bearing, the outer peripheral portion 59b is pulled up, which may result in separation between the central portion 58 and the inner and outer peripheral portion 59 if the bonding strength of the joint surface is weak. Since the central portion 58 made of a reinforced resin plate is merely covered with the inner and outer peripheral portion 59, the seal can be deformed in long-term use. If the bonding strength between the central portion 58 and the inner and outer peripheral portion 59 is weak, the former can be separated from the latter due to a difference in coefficient of linear expansion between them. In any case, the sealing performance will be impaired.

According to the third conventional technique, the material of the peripheral portions 60 and 61 is prepared by kneading at least two resins, i.e., an elastomer and the same resin as used for the intermediate resin portion 62 (annular insert). This leads to an increase in material cost. If the ratio of the elastomer in the resin mixture is increased, the peripheral portions 60 and 61 have improved flexibility but have poor adhesion to the intermediate resin portion 62. If, on the other hand, the ratio of the elastomer is decreased, the peripheral portions 60 and 61 are too hard and stiff, thereby resulting in poor sealing performance.

SUMMARY OF THE INVENTION

The present invention has been completed in the light of the above-described problems of conventional techniques. Accordingly, an object of the present invention is to provide a seal for rolling bearings which does not undergo separation between the core portion and the peripheral portion thereof or deformation in long-term use and thereby exhibit improved sealing properties for an extended period of time.

The object of the present invention is accomplished by a seal for a rolling bearing comprising a flexible resin portion which comes into contact with at least one of the seal grooves on inner and outer races and a rigid resin portion which is more rigid than the flexible resin portion, wherein the rigid resin portion and the flexible resin portion are fusion bonded together into an integral body.

In the present invention, because a flexible resin portion and a rigid resin portion that can be fusion bonded to each other are used, they are firmly joined together without using an adhesive or a like means.

DETAILED DESCRIPTION OF THE INVENTION

Preferred embodiments include the following constitutions (1) to (9).

(1) The resin constituting the rigid resin portion preferably has a melting point (or a softening point) higher than a melting point (or a softening point) of the resin constituting the flexible resin portion.

(2) The resin constituting the flexible resin portion preferably has a melting point (or a softening point) of from 100 to 300° C.

(3) The combination of the resin constituting the flexible resin portion and the resin constituting the rigid resin portion is preferably selected from the combination of a polyester TPE and a thermoplastic resin, the combination of a polyamide TPE and a polyamide resin, and the combination of a polyolefin TPE and a polyolefin resin.

(4) The flexible resin portion covers at least part of the surface of the rigid resin portion extending in the direction of press fitting the seal into a seal groove.

(5) The flexible resin portion, which is provided on at least one of the outer peripheral side and the inner peripheral side of the rigid resin portion and is to be press fitted into a seal groove of at least one of the outer race and inner race of a rolling bearing, is jointed to at least one of the outer peripheral surface and the inner peripheral surface of the rigid resin portion and the surface of the rigid resin portion extending in the direction of press fitting the seal into the seal groove of the outer race or the inner race.

(6) The flexible resin portion, which is provided on the outer peripheral side of the rigid resin portion and is to be press fitted into a seal groove of the outer race, is jointed to the outer peripheral surface of the rigid resin portion and the surface of the rigid resin portion extending in the direction of press fitting the seal into a seal groove of the outer race.

(7) The process of producing the seal described above preferably comprises molding a first portion with one resin selected from a flexible resin and a rigid resin, and then molding a second portion with the other resin such that the first portion and the second portion are integrated.

(8) The molding of the second portion is preferably effected such that the temperature in molding of the resin constituting the second portion is higher than the melting point or softening point of the resin constituting the first portion by 5 to 200° C.

(9) The temperature in molding of the resin constituting the second portion is preferably not more than 380° C. and is high than the melting point or softening point of the resin by 10 to 150° C.

First Embodiment

Figure 1:
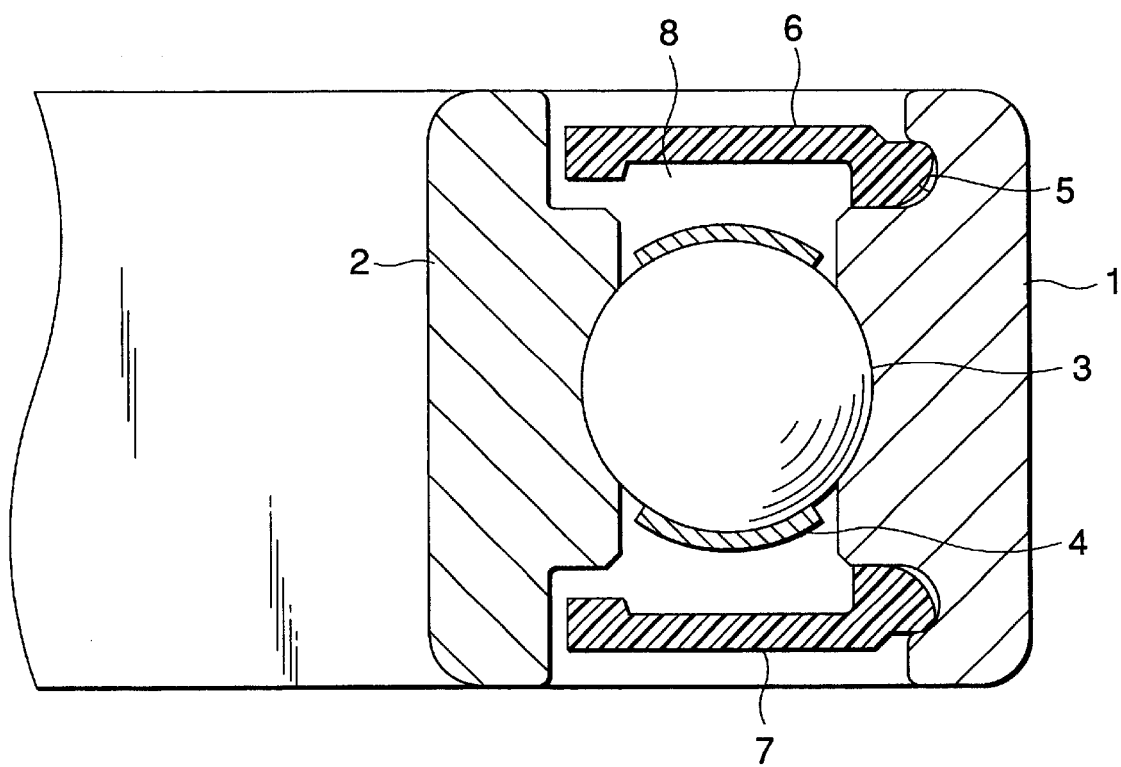
FIG. 1 a half cross sectional view of a rolling bearing with a seal according to a first embodiment of the present invention fitted therein.

FIG. 1 is a half cross section of a rolling bearing with a seal according to a first embodiment of the present invention fitted therein. The rolling bearing of FIG. 1 comprises a fixed outer race 1, a rotating inner race 2, rolling elements 3 that fit in between the outer race 1 and the inner race 2 with clearance, a cage 4 that holds the rolling elements 3, and seals 6 and 7 that are each fitted into an annular seal groove 5 without contact with the inner race 2. The rolling bearing has a lubricant, such as grease or a lubricating oil, sealed in its annular space 8 formed by the seals 6 and 7, the inner and outer races 1 and 2, and the rolling elements 3.

Figure 2:
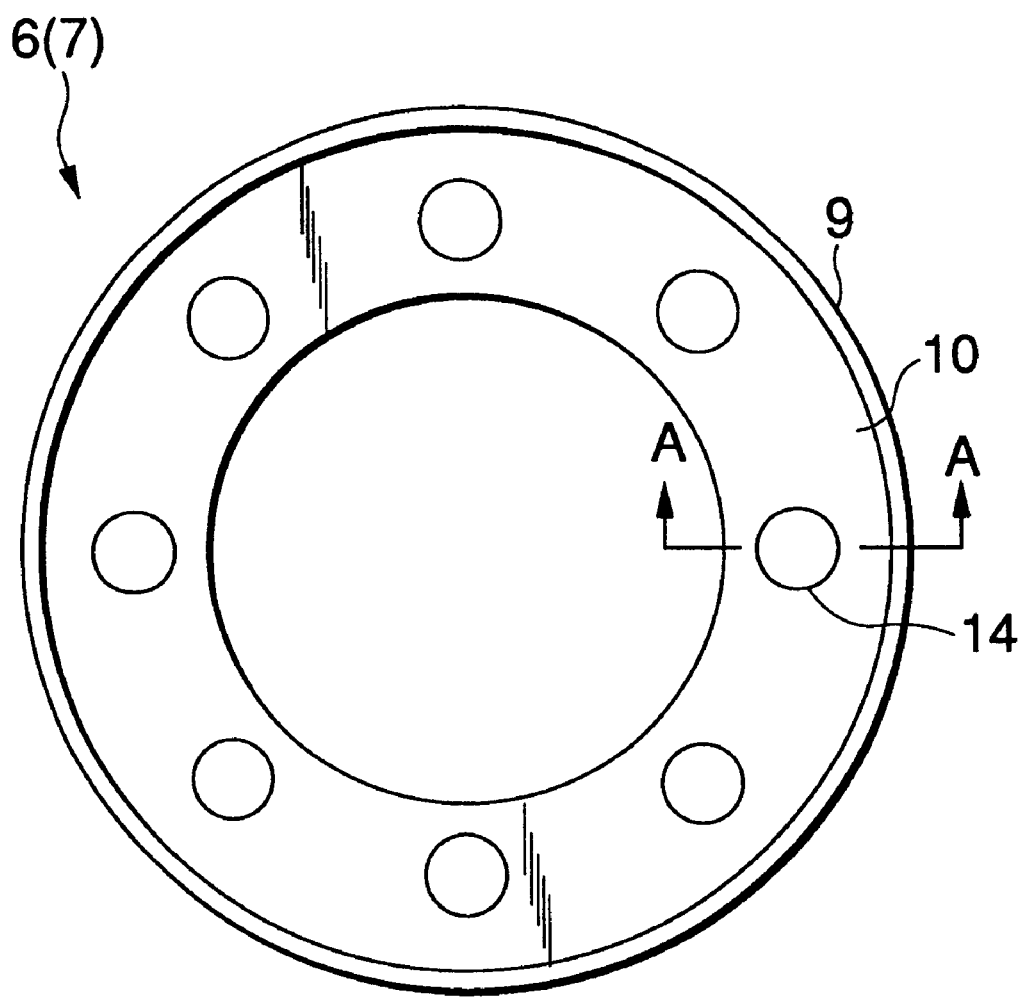
FIG. 2 is a plan view of the seal according to the first embodiment.
Figure 3:
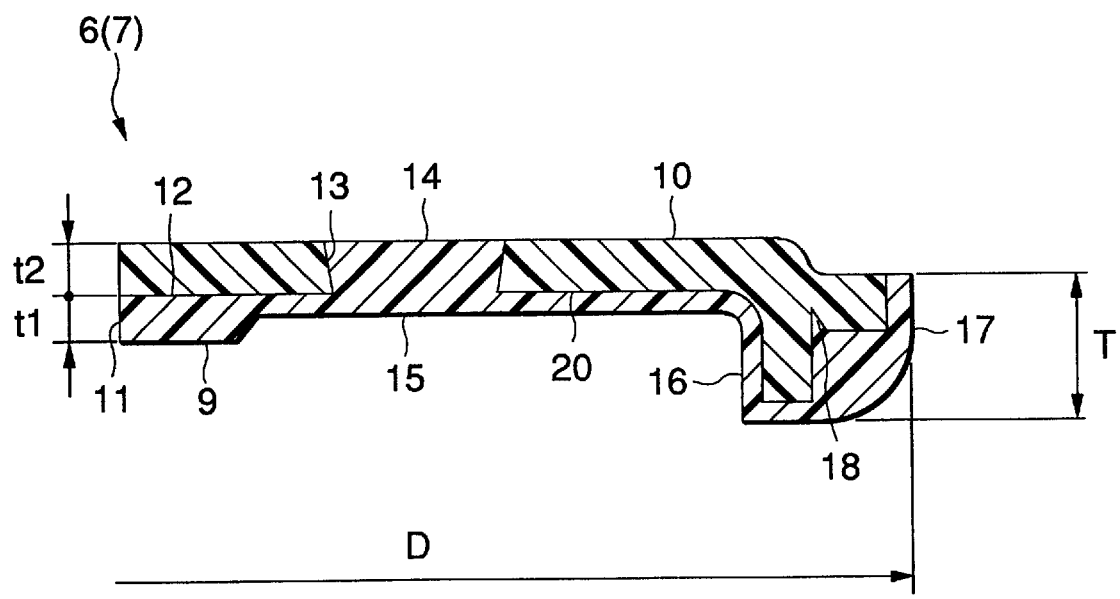
FIG. 3 is a cross sectional view of the seal of FIG. 2, taking along line A—A.

FIG. 2 is a plan view of the seal 6 (or 7), and FIG. 3 is a cross sectional view of the seal of FIG. 2, taken along line A–A.

As shown in FIG. 2, the seal 6 (or 7) has a doughnut shape in its plan view and is made up of a flexible resin portion 9 comprising a flexible resin material, such as a thermoplastic elastomer (hereinafter abbreviated as TPE), and a rigid resin portion 10 comprising a rigid resin material having a higher melting point (or a higher flowing point) and higher rigidity than the flexible resin portion 9, such as a polyamide resin.

As shown in FIG. 3, the ratio of the thickness (t1) of the flexible resin portion 9 at the inner peripheral part 11 to the thickness (t2) of the rigid resin portion 10 (t1:t2) is 1:1 to 1:3. That is, the thickness t1 of the flexible resin portion 9 having a relatively large coefficient of linear expansion is the same as or smaller than the thickness t2 of the rigid resin portion 10. By this manipulation, separation between the flexible resin portion 9 and the rigid resin portion 10 or deformation of the seals 6 and 7, which causes impairment of sealing properties, is prevented even if thermal strain occurs due to temperature change.

Described from the inner peripheral part 11 toward the outer peripheral part, the surface of the flexible resin portion 9 facing rolling elements 3 has a flat part 15 (having a straight line in FIG. 3, hereinafter called a first flat part), the end of the first flat part 15 bends down in the shape of the letter L to form a vertical part 16, the end of the vertical part 16 curves upward almost in an arc to form a sealing surface 17 which is to be fitted into the annular seal groove 5 of the outer race 1. The surface of the flexible resin portion 9 joined to the rigid resin portion 10 has a flat part 12 (having a straight line in FIG. 3, hereinafter called a second flat part) extending from its inner peripheral part 11. The end of the second flat part 12 protrudes with tapering 13 to form a protrusion 14 having an inverted trapezoidal shape. Next to the protrusion 14 is formed a third flat part 20 in parallel to the first flat part 15. The end of the third flat part 20 bends downward in parallel to the vertical part 16. The surface extending from the vertical part 16 then forms an annular V-shaped projection 18 projecting upward. The fool of the projection 18 extends toward the sealing surface 17 and then bend and connected to the sealing surface 17.

The rigid resin portion 10 has the same level with the projection 14 of the flexible resin portion 9. The surface of the portion 10 joined to the flexible resin portion 9 exactly matches the contour of the flexible resin portion 9 and has an almost uniform thickness. Back to FIG. 2, the rigid resin portion 10 surrounds each protrusion 14. In other words, the rigid resin portion 10 has a plurality of through-holes along its circumferential direction, in each of which the flexible resin material is inserted. The rigid resin portion 10 has an annular notch at the part corresponding to the annular V-shaped projection 18 of the flexible resin portion 9 so that the projection 18 is tightly fitted into the notch.

Figure 4:
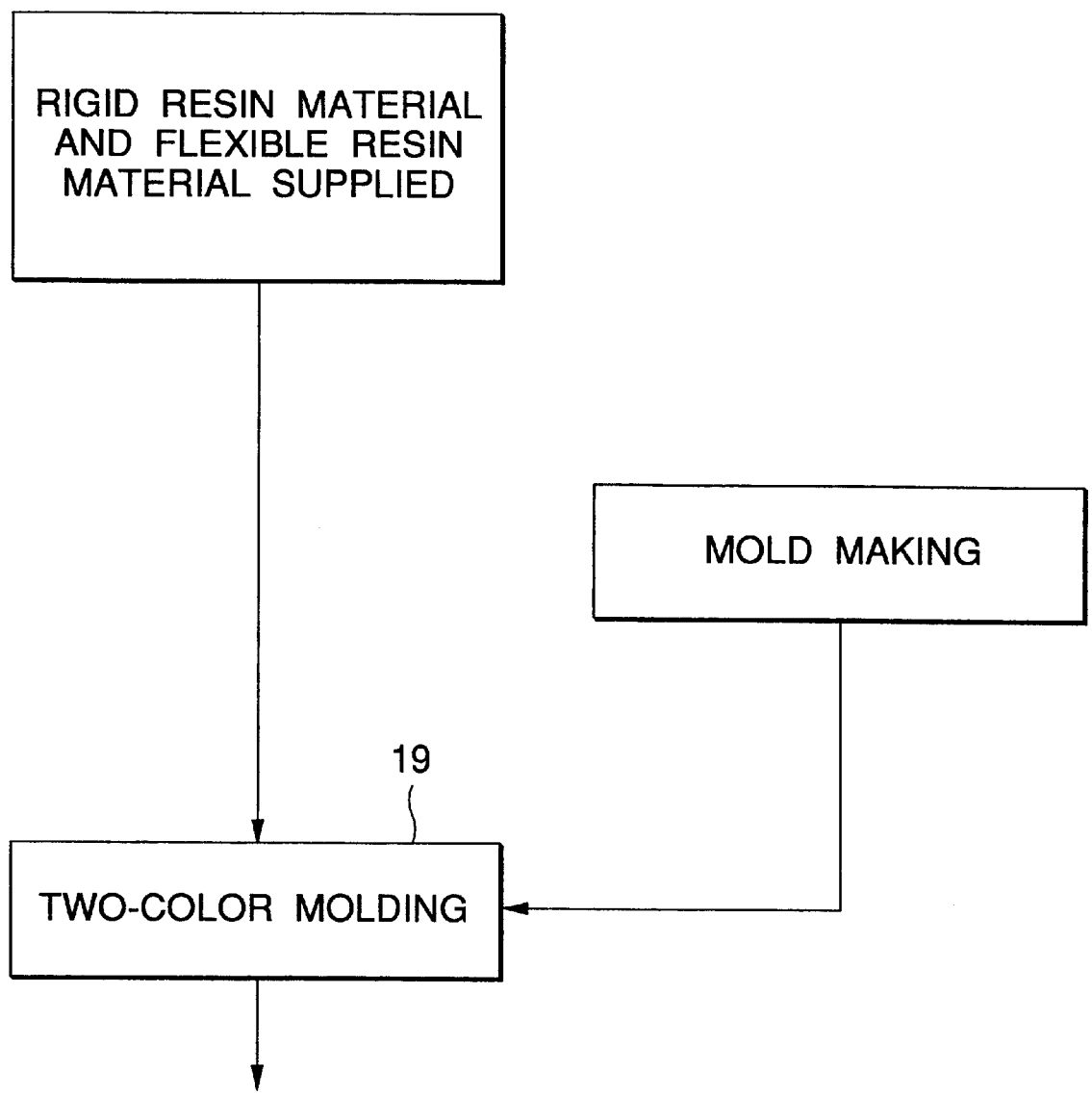
FIG. 4 is a flow chart showing the process for producing the seal according to the first embodiment.
Figure 23:
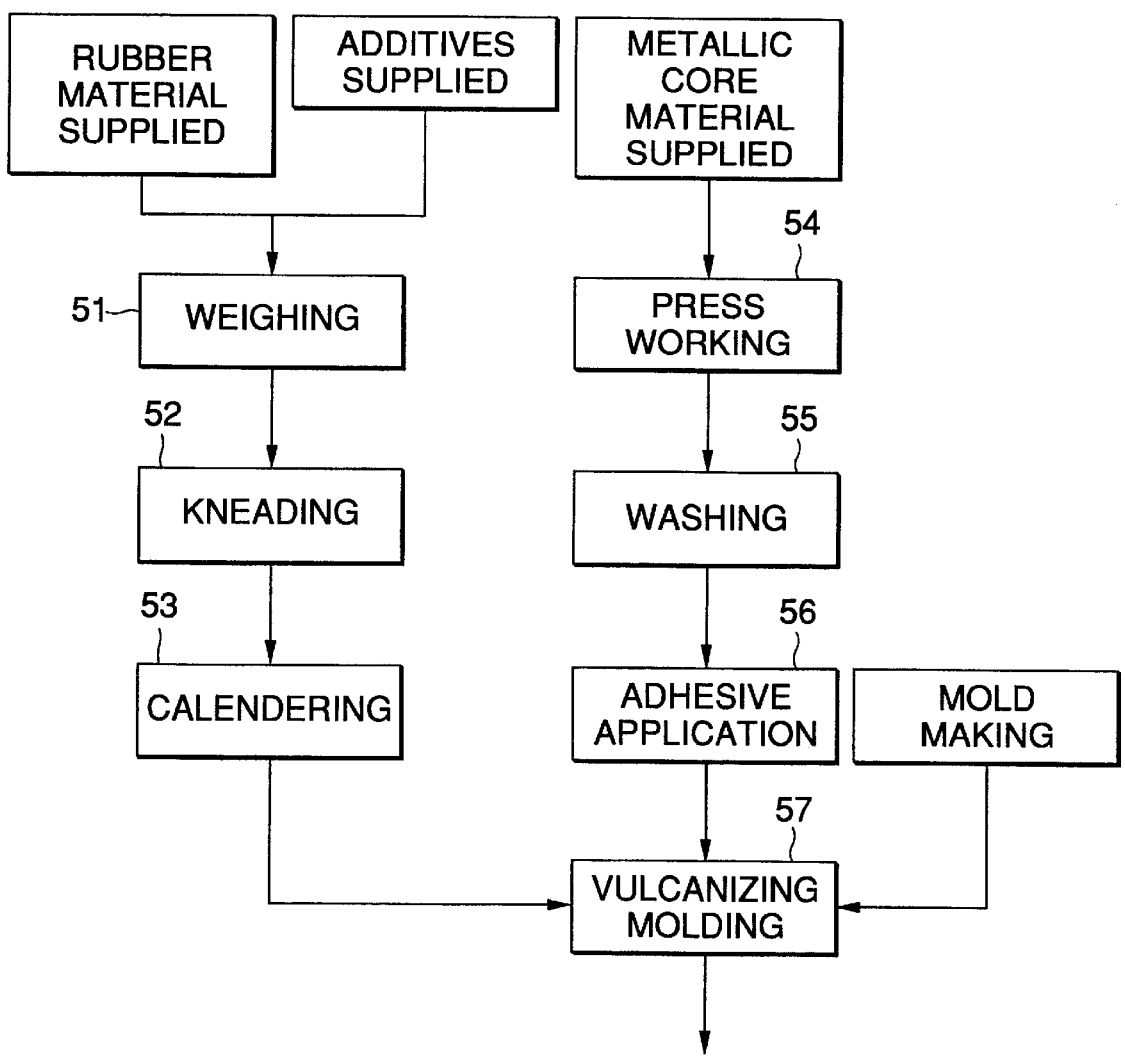
FIG. 23 shows a flow-chart showing a conventional process for producing rubber-made seals for rolling bearings.
Figure 24:
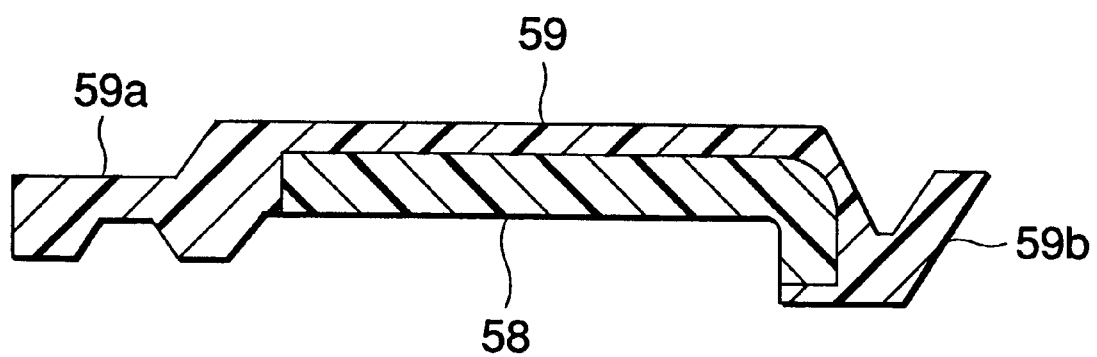
FIG. 24 is a cross sectional view of a conventional seal for rolling bearings.
Figure 25:
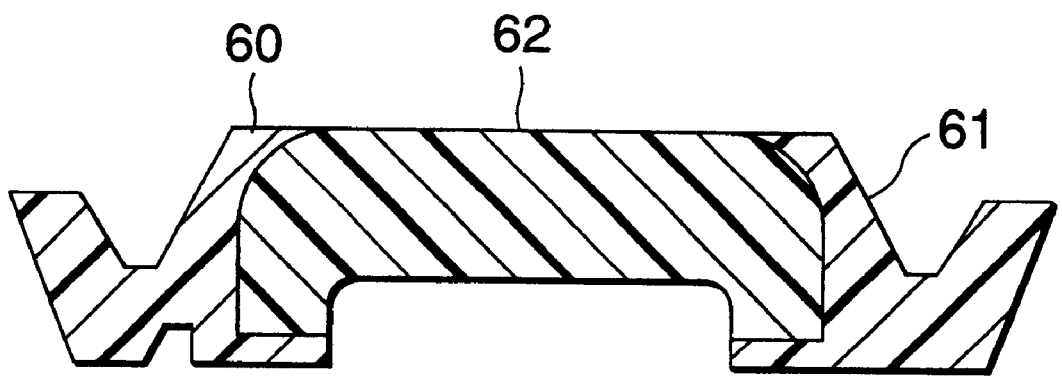
FIG. 25 is a cross sectional view of another conventional seal for rolling bearings.

As shown in the flow chart of FIG. 4, the seals 6 and 7 according to the first embodiment are produced by two-color molding. Therefore, such complicated steps as adhesive application step 56 as have been required in the first conventional technique (see FIG. 23) are not necessary, and the productivity is thus improved.

Two-color molding can be carried out by, for example, injecting a flexible resin material having a lower melting point into a mold and, after a prescribed delay (injection delay time) in the order of seconds, a rigid resin material is injected instantaneously whereby the flexible resin material at the interface (joint surface) is again melted and mingled with the rigid resin material. As a result, the two resin materials are firmly bonded by heat fusion, forming the flexible resin portion 9 and the rigid resin portion 10 in a unitary body.

In order for the two resin materials to be bonded with sufficient adhesion withstanding long-term use, the injection delay time is preferably within 2 seconds.

Because the flexible resin material having a lower melting point and the rigid resin material having a higher melting point are joined before the former solidifies, and the former resin re-melts at the joint surface and is mingled with the latter resin to provide firm adhesion, the two resin portions are not separated, and the seals 6 and 7 are prevented from deforming.

Where the thickness (t1) of the flexible resin portion 9 and the thickness (t2) of the rigid resin portion 10 satisfies the relationship t1:t2=1:1 to 1:3, the flexible resin portion 9 (peripheral portion) and the rigid resin portion 10 (core portion) are prevented from separation or deformation even in using a flexible resin material having a relatively high linear expansion coefficient.

Since the flexible resin portion 9 has protrusions 14 having tapering 13, which are each surrounded by the rigid resin portion 10, the protrusions 14 produce a so-called anchor effect in preventing the rigid resin portion 10 from separating from the flexible resin portion 9. The bonding between the portions 10 and 9 is thus enhanced.

The annular projection 18 of the flexible resin portion 9 is effective in preventing creep thereby improving the sealing properties. More specifically, because the sealing surface 17 that is in contact with the outer race 1 to exert sealing effects receives a compressive force in the radial direction from outside toward inside, it could follow that the tip of the sealing surface 17 undergoes creep to form a gap, resulting in reduction of the sealing properties. In the seals 6 and 7, since the annular projection 18 of the flexible resin portion 9 and the annular notch of the rigid resin portion 10 are intimately mating each other, the load imposed in the radial direction can be offset by the notch. As a result, the seals 6 and 7 retain the satisfactory sealing properties, hardly suffering from creep.

The combination of a flexible resin material and a rigid resin material can be selected taking into consideration the difference in melting point (or flowing point) between them, resistance to grease, resistance to oil, and the like. Suitable combinations include polyester TPE (thermoplastic elastomer)-nylon 6,6, polyamide TPE-nylon 6,6, polyolefin TPE-nylon 6,6, polyester TPE-polypropylene resin, polyamide TPE-polypropylene resin, and polyolefin TPE-polypropylene resin.

Various additives can be added to the flexible resin material as far as the effects of the present invention are not ruined, i.e., as far as such does not cause separation from the rigid resin portion 10 nor impairs the sealing properties. Useful additives include solid lubricants, such as graphite, fluororesin powder, molybdenum disulfide, tungsten disulfide, hexagonal boron nitride, fluorine-containing mica, and wax; liquid lubricants, such as a lubricating oil; antioxidants, heat stabilizers, ultraviolet absorbers, protecting agents against light, flame retardants, antistatic agents, flowability improving agents, non-stickiness imparting agents, crystallization accelerators, nucleating agents, plasticizers, pigments, and dyes. It is one of preferred embodiments that these compounding additives are added appropriately according to the end use.

The flexible resin material can be subjected to dynamic crosslinking to improve the mechanical characteristics. Dynamic crosslinking is carried out by mixing a flexible resin material and a rubber material, and the mixture is kneaded together with a prescribed crosslinking agent to crosslink the rubber while finely dispersing the rubber in the flexible resin material.

The rigid resin material can also contain various additives according to the end use as far as the effects of the present invention are not ruined. Examples of the additives include fibrous fillers such as glass fiber, carbon fibers, metallic fiber, organic fibers such as aramid fiber, various whiskers, and mineral fibers, tabular fillers such as glass flakes, mica, talc and clay, particulate fillers such as silica, calcium carbonate, glass beads and other inorganic powders, coupling agents, antioxidants, heat stabilizers, ultraviolet absorbers, protecting agents against light, flame retardants, antistatic agents, flowability improving agents, non-stickiness imparting agents, crystallization accelerators, nucleating agents, plasticizers, pigments, and dyes. It is one of preferred embodiments that these additives are added appropriately according to the end use.

In particular, addition of one or more than one of the fibrous, tabular or particulate fillers to the rigid resin material produces favorable effects in improving rigidity, suppressing warpage, and improving dimensional stability of the sealing surface 17 (i.e., reducing the linear expansion, coefficient). The additives are preferably added in a total amount of 5 to 60% by weight based on the rigid resin material. If the total amount of the fillers is less than 5% by weight, the effects on rigidity, warpage, and linear expansion coefficient are insubstantial. Since the effects of fillers are saturated at an amount of 60% by weight, addition of more than 60% by weight produces no appreciable further improvements, rather resulting in impairment of moldability of the resin material and external appearance of the resulting seal.

It is preferred that the modulus of elasticity of the rigid resin material be at least 5 times that of the flexible resin material. If the modulus of elasticity of the former is less than 5 times that of the latter, not only is required a great force in press fitting the seal 6 or 7 into the seal groove 5, but deformation of the sealing surface 17 or break of the flexible resin portion 9 may be caused. In the case of, in particular, a contact type seal, which is brought into light contact with an inner race, as will be illustrated later (see FIG. 16), there is the possibility that the revolving torque increases. From this point of view, too, it is preferred that the modulus of elasticity of the rigid resin material be at least 5 times that of the flexible resin material. The seal for a bearing having a desired ratio of the modulus of elasticity can be obtained by adding the above-described solid lubricants to the flexible resin material or adding the above-described fibrous fillers to the rigid resin material.

As described above, the seal is produced by two-color injection molding as the first embodiment according to the present invention, but it can be produced by insert molding as in a second embodiment hereinafter described, whereby the necessity of the adhesive application step 56 is excluded to improve productivity as well.

Modifications that can be made to the first embodiment will be illustrated below referring to FIGS. 5(a) through 8(d).

Figure 5A:
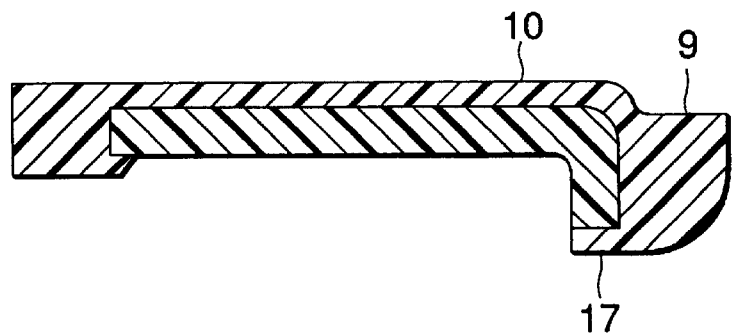
FIGS. 5(a) to (c) are cross sectional views showing a first modification to the first embodiment.
Figure 5B:
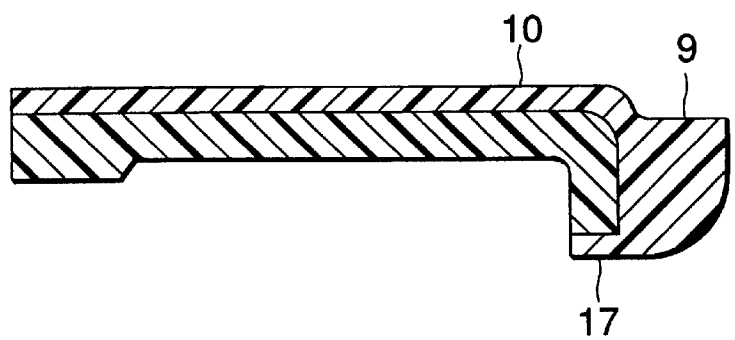
Figure 5C:
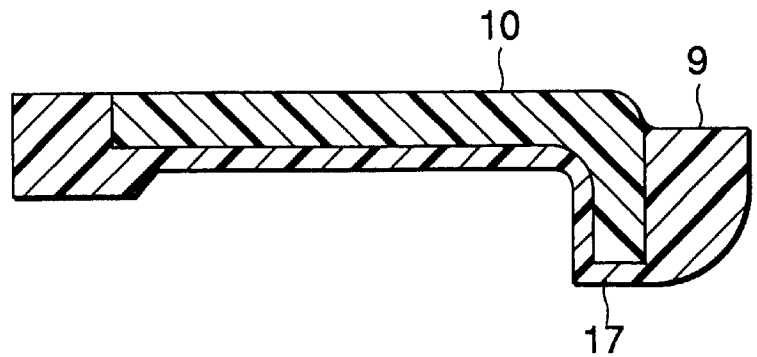

FIGS. 5(a) to 5(c) are cross sections of a first modification of the seal according to the first embodiment. The seals of FIG. 5(a) to 5(c) are characterized in that the volume of the flexible resin portion 9 in the vicinity of the sealing surface 17 is increased so that the volume of the rigid resin portion 10 at the sealing part may be minimized. This modification aims at minimizing deformation of the outer race 1, which is in contact with the sealing surface 17.

The contours of the two resin portions shown in FIGS. 5(a) to 5(c) are simpler, and yet these seals are sufficiently practical for some uses because of the firm bonding of the flexible resin portion 9 and the rigid resin portion 10 which owes to the re-melting of the flexible resin material.

Figure 6A:
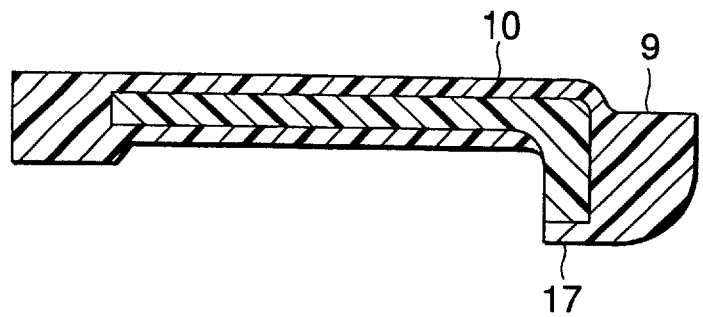
FIGS. 6(a) to (d) are cross sectional views showing a second modification to the first embodiment.
Figure 6B:
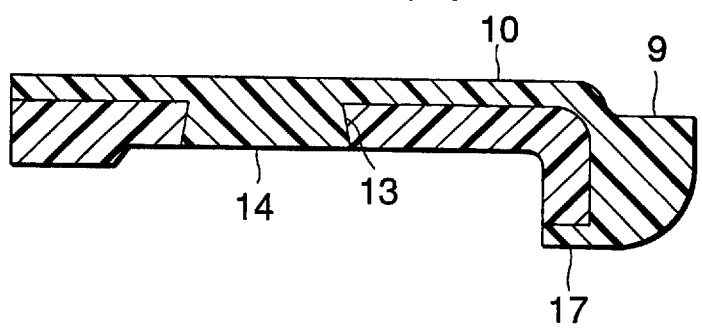
Figure 6C:
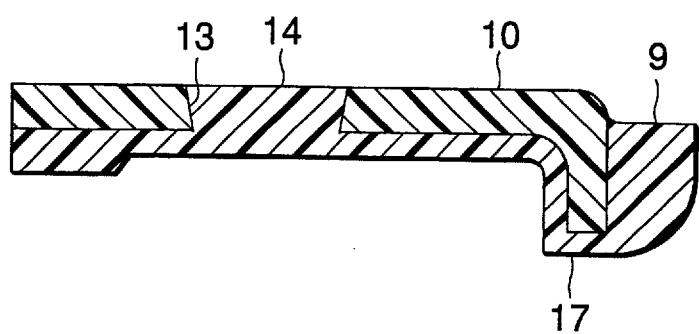
Figure 6D:
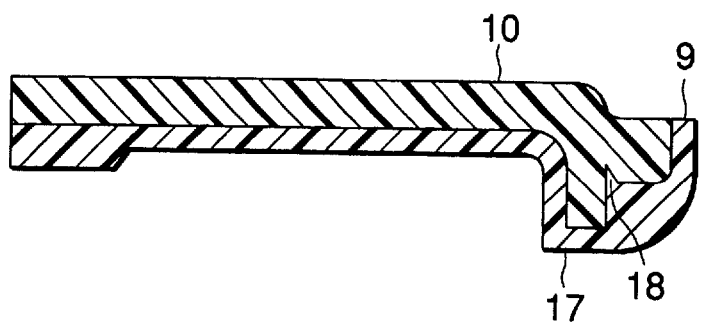

FIGS. 6(a) to (d) furnish cross sectional views showing a second modification made to the first embodiment. In the second modification, various manipulations are added to the first embodiment so that the rigid resin portion 10 and the flexible resin portion 9 may not be separated from each other when the seal is press fitted into the annular seal groove 5. FIG. 6 (a) illustrates a seal in which the flexible resin portion 9 at the sealing part has an increased volume, and the rigid resin portion 10 is enveloped by the flexible resin portion 9 so that these resin portions may not be separated from each other. FIGS. 6(b) and (c) each depict a modification in which the flexible resin portion 9 at the sealing part has an increased volume, and protrusions 14 with tapering 13 are provided thereby ensuring the adhesion between the two resin portions 9 and 10 by the anchor effect. The seal shown in FIG. 6(d) is not provided with the protrusions 14 but has an annular projection 18 to suppress creep at the sealing part.

Figure 7A:
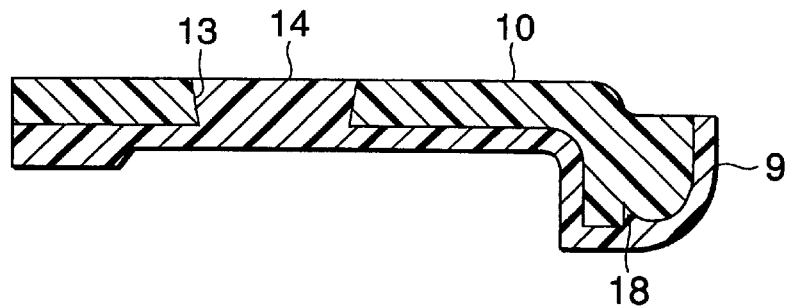
FIGS. 7(a) to (c) are cross sectional views showing a third modification to the first embodiment.
Figure 7B:
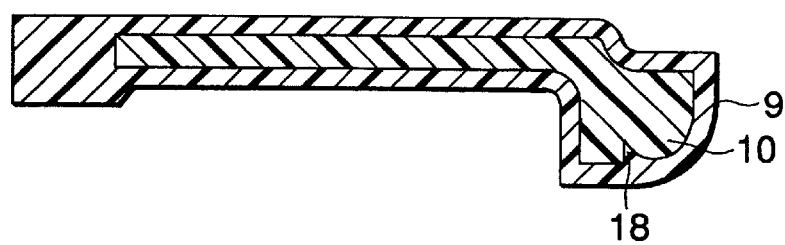
Figure 7C:
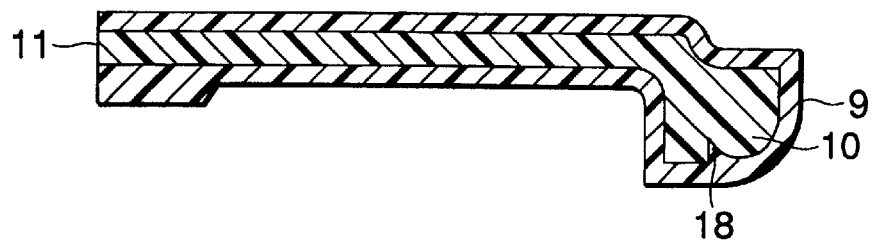

FIGS. 7(a) to (c) are cross sections showing a third modification to the first embodiment. In the third modification, the flexible resin portion 9 has a reduced thickness at the sealing part so that the absolute amount of creep is reduced to improve the sealing properties. In order to prevent the rigid resin portion 10 from separating from the flexible resin portion 9, protrusions 14 with tapering 13 are provided as shown in FIG. 7(a), or all over the surface of the rigid resin portion 10 is covered with the flexible resin portion 9 as shown in FIG. 7(b), or the surface of the rigid resin portion 10 except the inner peripheral part 11 is covered with the flexible resin portion 9 as shown in FIG. 7(c).

Figure 8A:
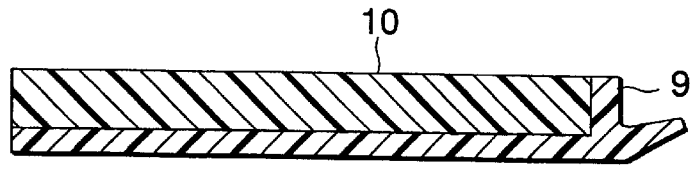
FIGS. 8(a) to (d) are cross sectional views showing a fourth modification to the first embodiment.
Figure 8B:
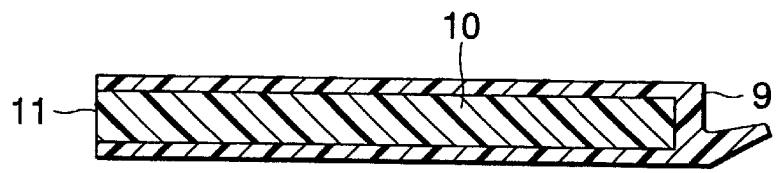
Figure 8C:
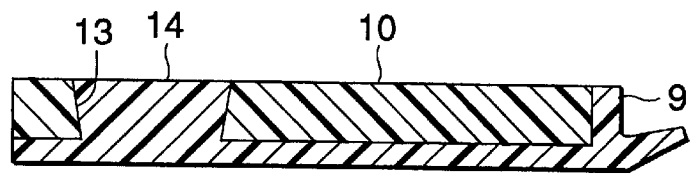
Figure 8D:
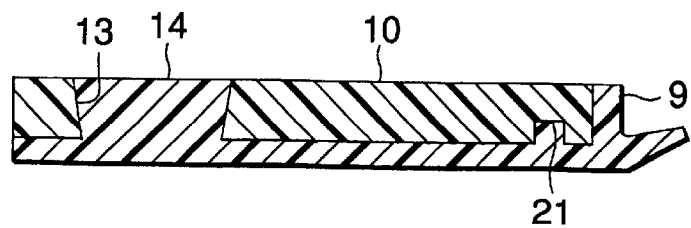

FIGS. 8(a) to (d) are cross sections showing a fourth modification to the first embodiment, in which the design is modified to cope with a rolling bearing having a small width. The seal of FIG. 8(a) is made up of the flexible resin portion 9 on the inner side and at the sealing part thereof and the rigid resin portion 10 on the outer side thereof except the sealing part. For preventing separation between the flexible resin portion 9 and the rigid resin portion 10, the rigid resin portion 10 except the inner peripheral part 11 is covered with the flexible resin portion 9 as shown in FIG. 8(b), or protrusions 14 with tapering 13 are provided as shown in FIG. 8(c). In FIG. 8(d) the seal of FIG. 8(c) has an annular projection 21 so as to suppress creep at the sealing part.

Second Embodiment

Figure 9:
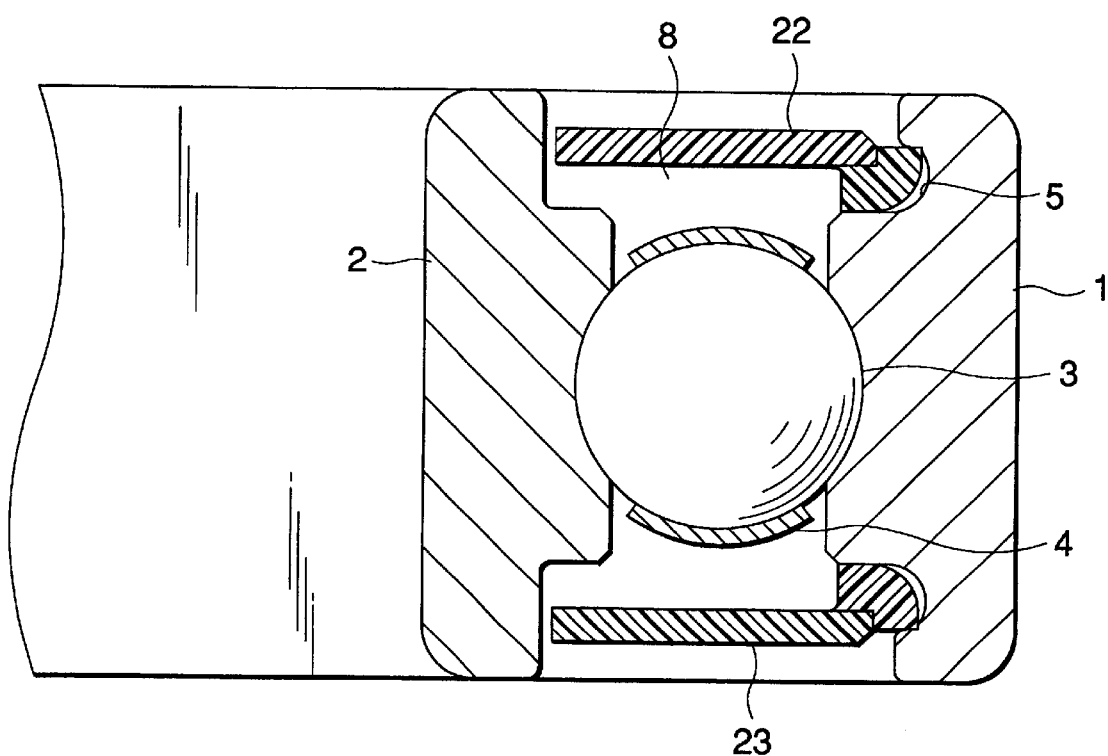
FIG. 9 is a half cross sectional view of a rolling bearing sealed by the seal according to a second embodiment of the present invention.

FIG. 9 is a half cross sectional view of a rolling bearing with a seal according to a second embodiment of the present invention fitted therein. Similarly to the first embodiment, seals 22 and 23 are each fitted into an annular seal groove 5 of the outer race 1, with their inner peripheral part being not in contact with the inner race 2.

Figure 10:
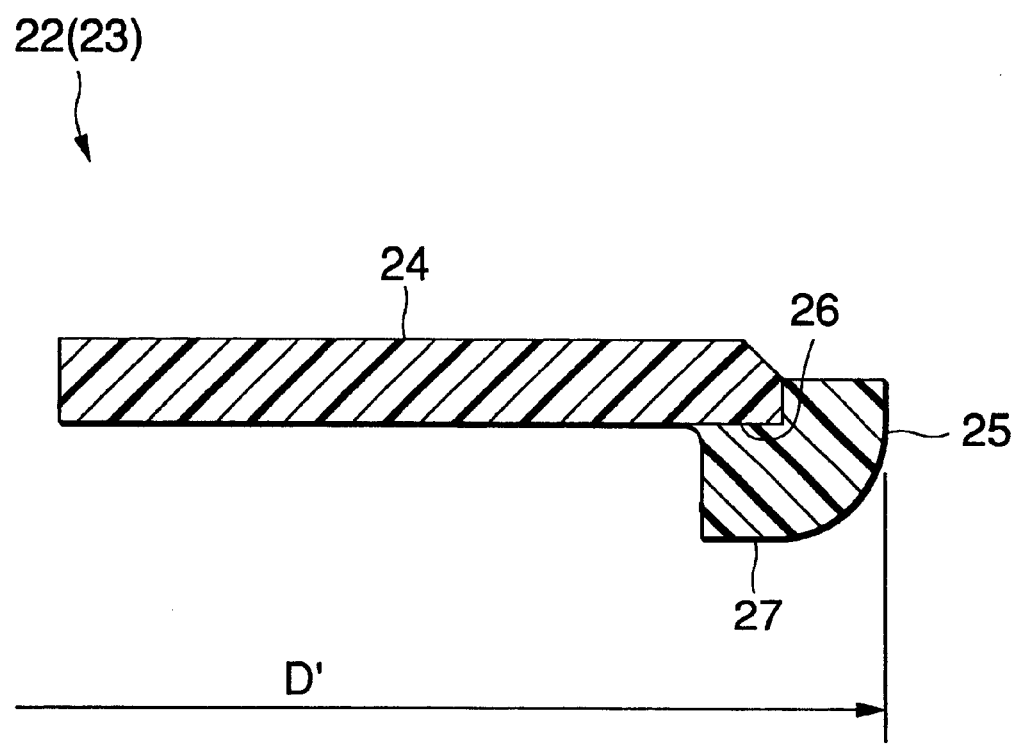
FIG. 10 is a cross sectional view of the seal according to the second embodiment.

As shown in FIG. 10, the seals 22 (or 23) is comprised of a rigid resin portion 24 having an almost rectangular cross section and a flexible resin portion 25 having an almost fan-shaped cross section which is joined to the outer peripheral part of the rigid resin portion 24 into a unitary body. The flexible resin portion 25 is L-shaped at the interface 26 joining to the rigid resin portion 24 and, similarly to the first embodiment, arc-shaped at the sealing surface 27.

Figure 11:
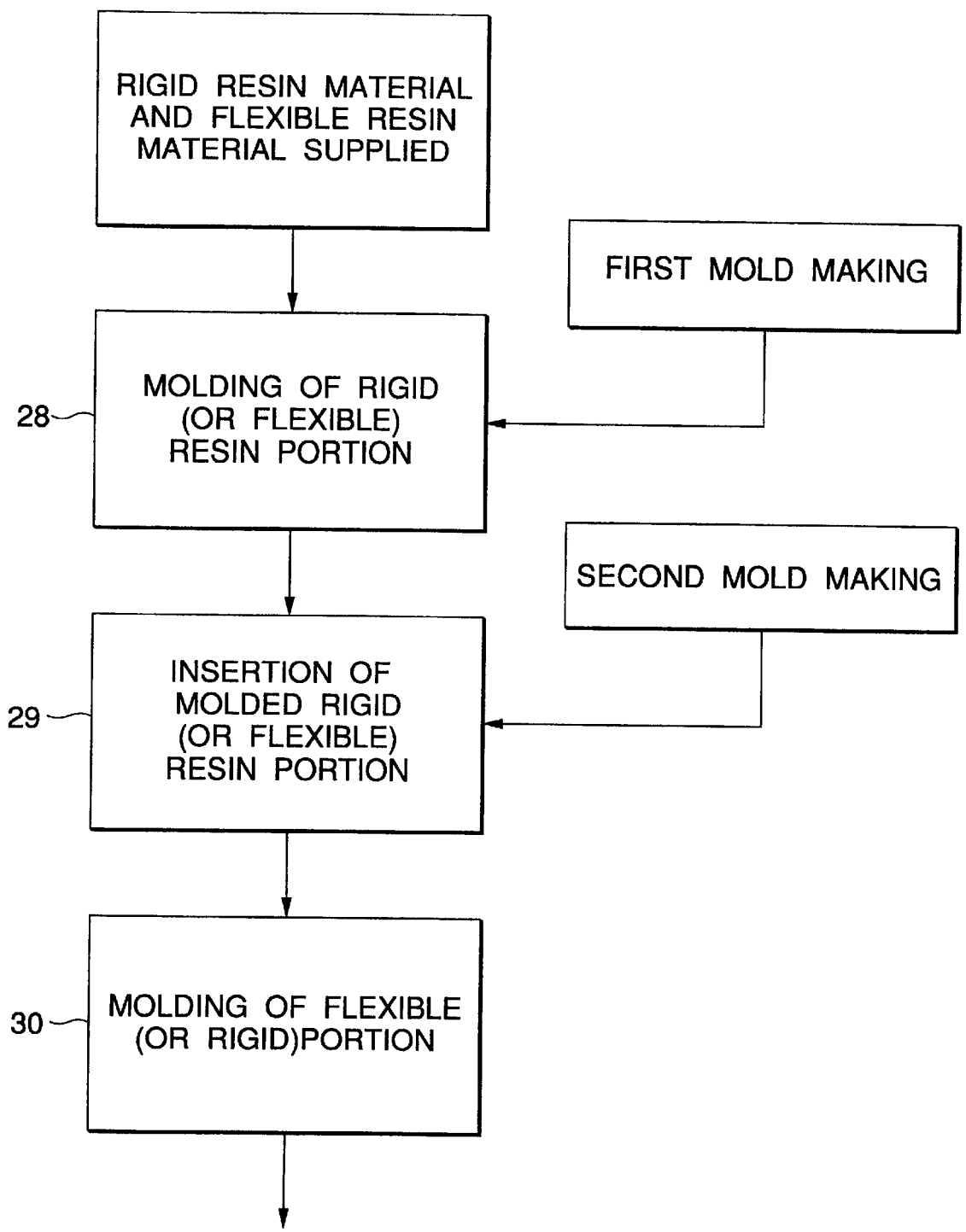
FIG. 11 is a flow chart showing the process for producing the seal of the second embodiment.

The seals 22 and 23 according to the second embodiment can be produced by insert molding comprising a first injection molding step, an insertion step, and a second injection molding step as illustrated in FIG. 11. More specifically, in first injection molding step 28, either one of a rigid resin material and a flexible resin material that can be fusion bonded to each other (the first material to be injected in insert molding or two-color molding will be designated "first material"). For example, a rigid resin material-is injected first into a first mold to prepare a rigid resin part 24. In insertion step 29, the rigid resin part 24 is put into a second mold as an insert. In second injection molding step 30, the other resin material (the material injected later in insert molding or two-color molding will be designated "second material"), e.g., a flexible resin material is injected into the second mold. The injected molten second material (flexible resin material) re-melts the joint surface of the insert (rigid resin part 24) to cause mutual diffusion at the interface. As a result, the first material (rigid resin material) and the second material (flexible resin material) are firmly fusion-bonded to produce the seal 22 (or 23) made up of the rigid resin portion 24 having the flexible resin portion 25 firmly and integrally bonded to the outer peripheral part thereof. While in the above explanation the rigid resin material is used as a first material, the same applies to the case of using the flexible resin material as a first material.

According to the second embodiment, such complicated steps as adhesive application step 56 as have been required in the first conventional technique (see FIG. 23) are not necessary, and the productivity is thus improved.

The seals according to the second embodiment can also be produced by two-color molding similarly to the first embodiment. In this case, too, the same process advantage to productivity is enjoyed as in the insert molding. Two-color molding can be carried out by injecting a first material (either one of the flexible resin material and the rigid resin material) in a mold and, after the surface of the first material solidifies, rapidly injecting a second material (the other resin material) into the same mold. The solidified joint surface 26 of the first material re-melts to cause mutual diffusion at the interface. Thus, a desired seal comprising the first and second materials firmly joined together can be produced with ease and improved productivity similarly to the case of insert molding.

Because the first material re-melts to provide firm adhesion between the first and second materials in the second embodiment, there is provided a seal having improved sealing properties in which the two resin parts undergo no separation nor deformation.

According to the second embodiment, since the first and second materials are fusion-bonded by re-melting of the first material, it is important that the first and second materials be selected based on their melting points as for crystalline resins or their softening points as for noncrystalline resins. Further, the temperature of the second resin material to be set is of importance in relation to its own melting point or softening point.

The relationships between melting points or softening points of resin materials and resin temperatures are described below. The relationships can be utilized for the first embodiment in which an insert molding is effected, as well as the second embodiment.

The term "melting point" as used herein is intended to mean a melting point as for a crystalline resin or a softening point as for a noncrystalline resin, which can be measured according to JIS K 7121 and JIS K 7206, respectively.

I. Relationship Between Melting Point of First Material and Melting Point of Second Material In order for the resin part formed of a first material to re-melt, the resin temperature thereof should reach the temperature at which the first material melts. However, where the first material has a higher melting point than the second material, the resin temperature of the second material must be set fairly higher than the melting point of the second material, which tends to cause considerable thermal deterioration of the second material. Therefore, the resin materials are preferably selected and combined in such a manner that the first material has a lower melting point than the second material.

II. Melting Point of First Material

The resin materials are required to have excellent mechanical properties and heat resistance. If the first material has a melting point lower than 100° C., it becomes waxy on re-melting when brought into contact with the second material set at a prescribed resin temperature and is to have deteriorated mechanical strength. Such a resin portion will also have poor heat resistance in practical use. On the other hand, resin materials having a melting point exceeding 300° C. incur an increase of cost and are not practical for use as a first material. Further, use of a first material having such a high melting point makes the freedom of choice of a second material narrower because the second material is preferably selected so as to have a higher melting point than, the first one. Besides, in this case, the resin temperature of the second material should be set considerably higher than the melting point of its own, which results in serious deterioration of the second material itself. Accordingly, the melting point of the first material is preferably in the range of from 100 to 300° C.

III. Relationship Between Melting Point of First Material and Resin Temperature of Second Material In the second embodiment of the present invention, since the first material should re-melt on contact with the second material, the second material injected in second injection molding step 30 must have a higher resin temperature than the melting point of the first material. If the difference between the resin temperature of the second material and the melting point of the first material is smaller than 5° C., the re-melting of the resin part made of the first material at the contact surface tends to be insufficient, resulting in a failure of providing sufficient bonding strength. If, on the other hand, the temperature difference exceeds 200° C., the resin part made of the first material tends to re-melt at not only the contact surface but the other areas, hardly retaining its shape. Accordingly, the temperature difference ((resin temperature of the second material)—(melting point of the first material)) is preferably in the range of from 5 to 200° C.

IV. Relationship Between Resin Temperature of Second Material and Melting Point of Second Material In order to firmly bond the first and second materials by heat fusion, the resin temperature of the second material should be higher than its own melting point. If the difference between the resin temperature of the second material and the melting point of its own is smaller than 10° C., the molten second material has unsatisfactory moldability due to a still high viscosity and poor flowability. If the temperature difference is greater than 150° C. or if the resin temperature of the second material exceeds 380° C., the second material undergoes appreciable deterioration even with such a measure as displacement of the atmosphere with an inert gas being taken. Accordingly, it is preferred that the resin temperature of the second material be higher than the melting point of the second material by a difference of from 10 to 150° C. and that the resin temperature of the second material be 380° C. or lower.

It is a preferred manipulation for obtaining satisfactory bonding that the molded part made of the first: material is preheated.

A flexible resin material and a rigid resin material should be so combined that they may be bonded together by heat fusion. Resins having the same functional group or the same repeating unit per molecule can be combined. Suitable combinations include [I] polyester TPE-polyester resin, [II] polyamide TPE-polyamide resin, and [III] polyolefin TPE-polyolefin resin.

The polyester resin used in combination [I] includes polybutylene terephthalate (hereinafter abbreviated as PBT), polyethylene terephthalate (hereinafter abbreviated as PET), and a mixture of PBT and PET. The polyamide resin used in combination [II] includes nylon 6, nylon 11, nylon 12, nylon 4,6, nylon 6,6, nylon 6,10, nylon 6,12, aromatic polyamide resins, polyamide MXD 6, and mixtures of two or more thereof. The polyolefin resin belonging to combination [III] includes polyethylene, polypropylene, polybutene, polymethylpentene, and mixtures of two or more thereof. Examples of combinations [I] to [III] are tabled below.

TABLE 1

| | Flexible Resin Material | Rigid Resin Material |
|---|---|---|
| [I] | polyester TPE | polyester resin, e.g., PBT, PET, and PBT/PET mixture |
| [II] | polyamide TPE | polyamide resin, e.g., nylon 6, nylon 11, nylon 12, nylon 4,6, nylon 6,6, nylon 6,10, nylon 6,12, aromatic polyamide, polyamide MXD 6, and mixtures of two or more thereof |
| [III] | polyolefin TPE | polyolefin resin, e.g., polyethylene, polypropylene, polybutene, polymethylpentene, and mixtures of two or more thereof |

Taking heat resistance and oil resistance into consideration, combinations [I] and [II] are preferred. That is, a combination of a polyester TPE and a polyester resin (e.g., PBT) and a combination of a polyamide TPE and a polyamide resin (e.g., nylon 6).

Similarly to the first embodiment, it is preferred in the second embodiment that various compounding additives be added to the resin materials as far as the effects of the present invention are not impaired. It is also preferred that the modulus of elasticity of the rigid resin material be at least 5 times that of the flexible resin material for the same reasons as described with respect to the first embodiment, which can be achieved by addition of appropriate compounding additives.

Modifications which can be made to the second embodiment are described by referring to FIGS. 12(a) through 20.

Figure 12A:
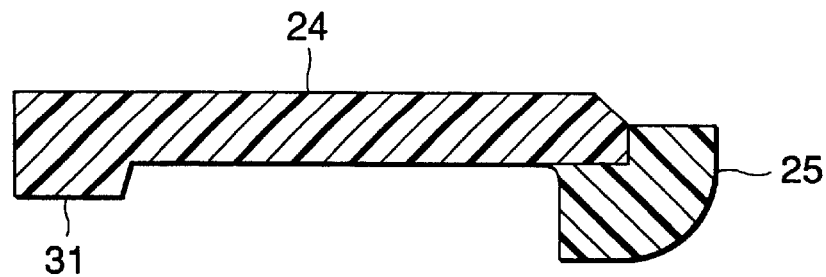
FIGS. 12(a) to (c) are cross sectional views showing a first modification to the second embodiment.
Figure 12B:
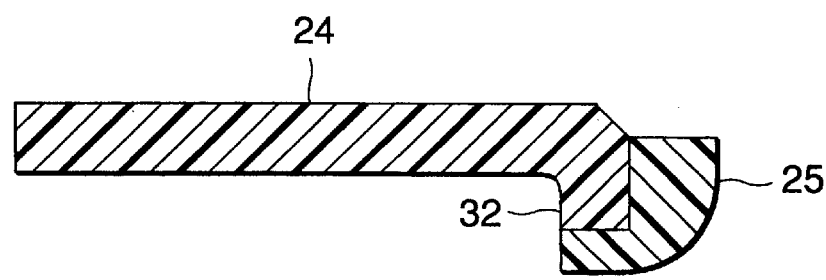
Figure 12C:
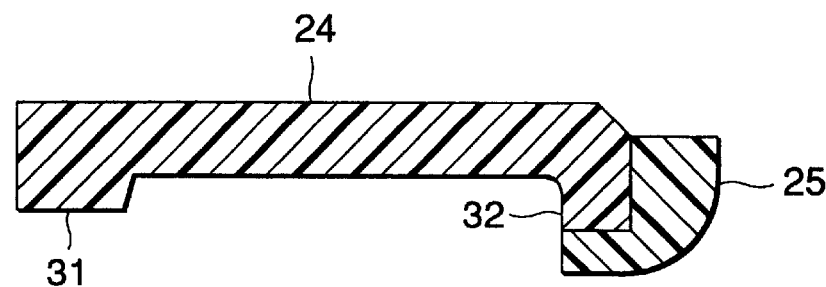
Figure 13A:
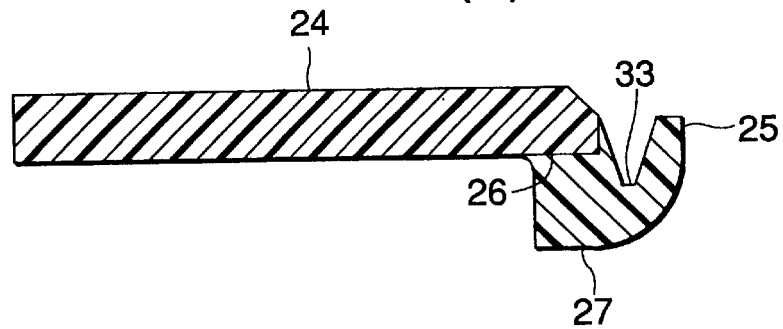
FIGS. 13(a) to (d) are cross sectional views showing a second modification to the second embodiment.
Figure 13B:
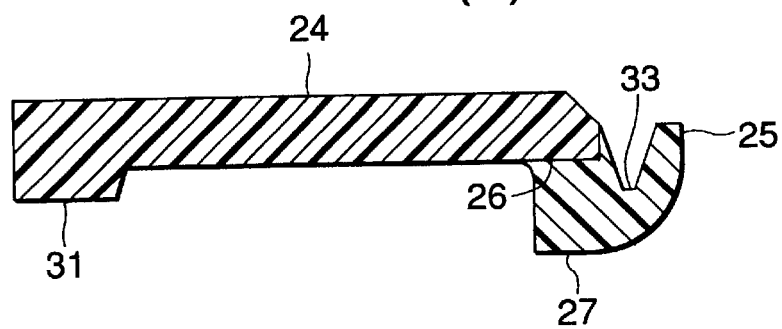
Figure 13C:
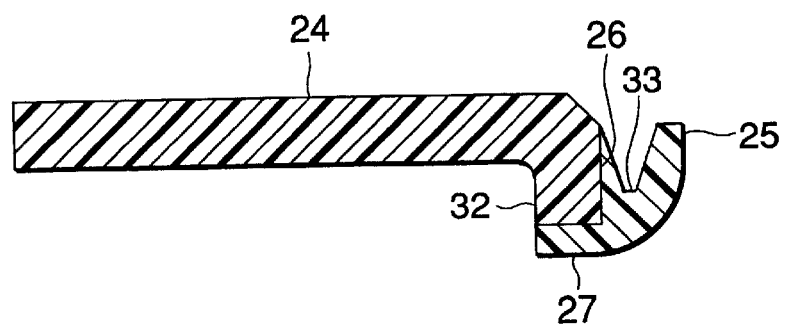
Figure 13D:
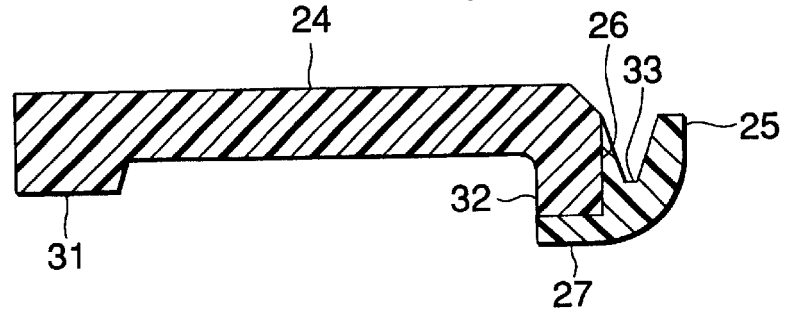

FIGS. 12(a) to (c) illustrate cross sections showing a first modification, in which the rigid resin portion 24 has its thickness increased at the inner peripheral part and/or the outer peripheral part to improve the rigidity of the seal. That is, the rigid resin portion 24 of FIG. 12(a) has a thicker part 31 at the inner peripheral part thereof, which is thicker than the other part of the rigid resin portion 24; the rigid resin portion 24 of FIG. 12(b) has a thicker part 32 at the outer peripheral part thereof, which is thicker than the other part. The rigid resin portion 24 of FIG. 12(c) has the thicker part 31 at the inner peripheral part and the thicker part 32 at the outer peripheral part. The seals according to the first modification exhibit further improved rigidity owing to the thicker parts 31 and/or 32.

FIGS. 13(a) to (d) are cross sections showing a second modification of the second embodiment. In the modification shown in FIGS. 13(a) to (d), each of the rigid resin portions 24 shown in FIGS. 10 and 12(a) to (c) is used, and the flexible resin portion 25 has a V-cut 33 on the side opposite to the sealing surface 27. The V-cut 33 made in the flexible resin portion 25 reduces the pressing force required in press fitting the seal 22 (or 23) into the seal groove 5 of the outer race 1 and prevents the joint surface 26 from being loaded with an excessively large force.

Figure 14A:
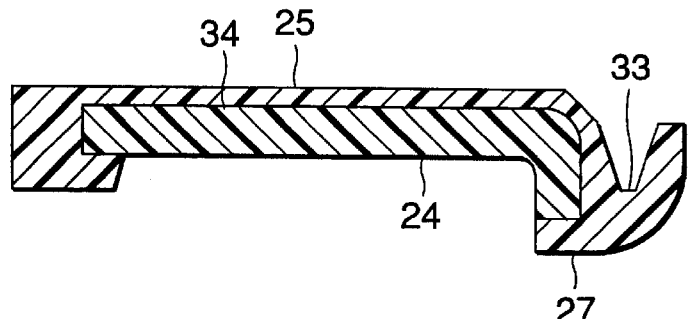
FIGS. 14(a) to (d) are cross sectional views showing a third modification to the second embodiment.
Figure 14B:
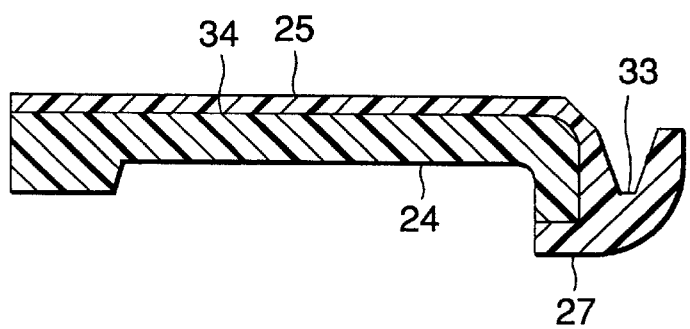
Figure 14C:
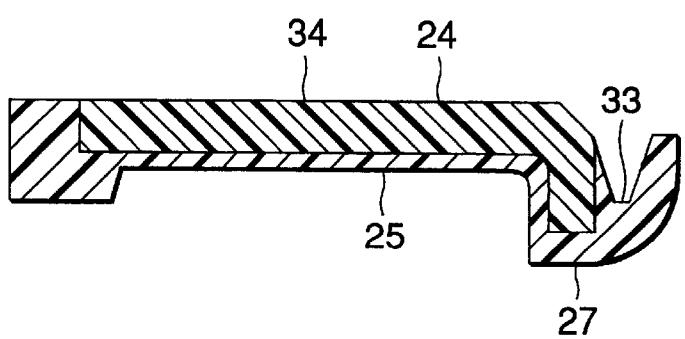
Figure 14D:
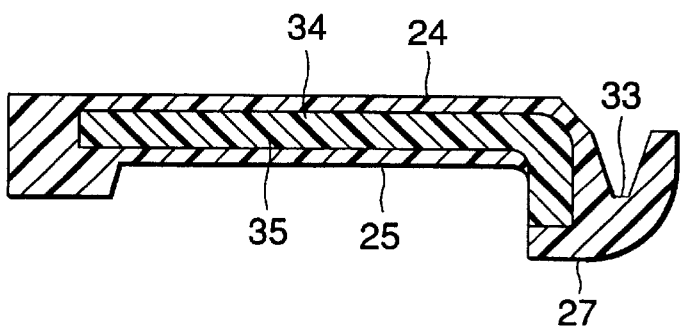

FIGS. 14(a) to (d) are cross sections showing a third modification made to the second embodiment. In the modification shown in FIGS. 14(a) to (d), the flexible resin portion 25 has the V-cut 33, and additionally, the upper side and/or the lower side of the rigid resin portion 24 is/are covered with the flexible resin portion 25. FIGS. 14(a) and (b) show examples in which the flexible resin portion 25 covers the upper side 34 of the rigid resin portion 24. In FIG. 14(c) the flexible resin portion 25 covers the lower side 35 of the rigid resin portion 24. In FIG. 14(d) the flexible resin portion 25 covers both the upper side 34 and the lower side 35 of the rigid resin portion 24. By this modification, the joint surface area between the two resin portions is increased to ensure the firm adhesion.

Figure 15A:
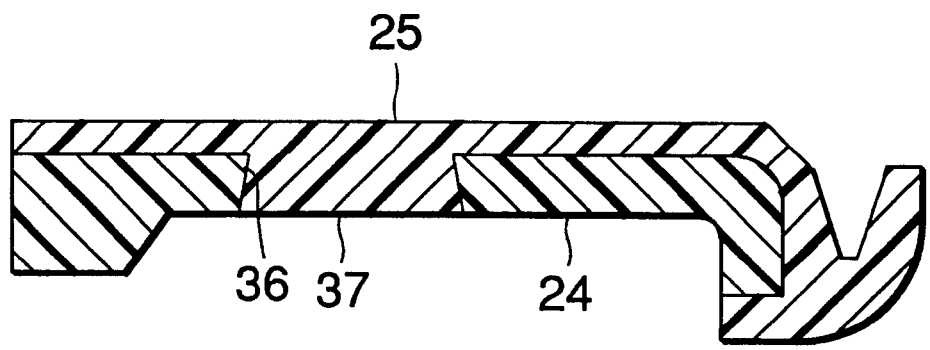
FIGS. 15(a) and (b) are cross sectional views showing a fourth modification to the second embodiment.
Figure 15B:
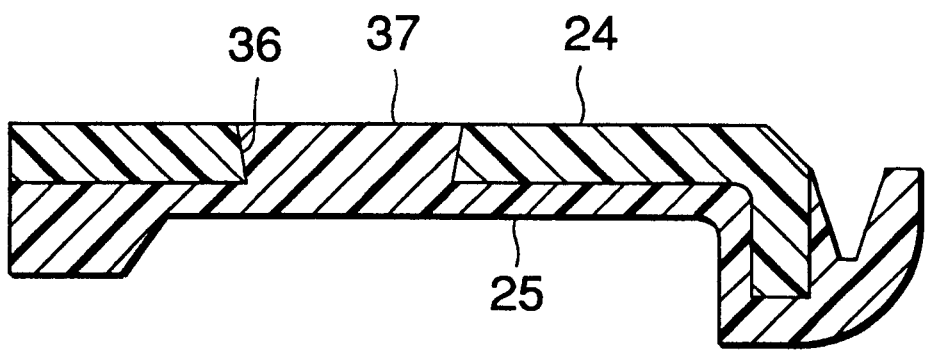

FIGS. 15(a) and (b) provide cross sections showing a fourth modification of the second embodiment. In the modification, the flexible resin portion 25 has a protrusion 37 with tapering 36 as shown in FIG. 15(a) or (b). The tapered protrusion 37 produces an anchor effect to provide ensured adhesion between the two resin portions so as to prevent their separation.

Figure 16:
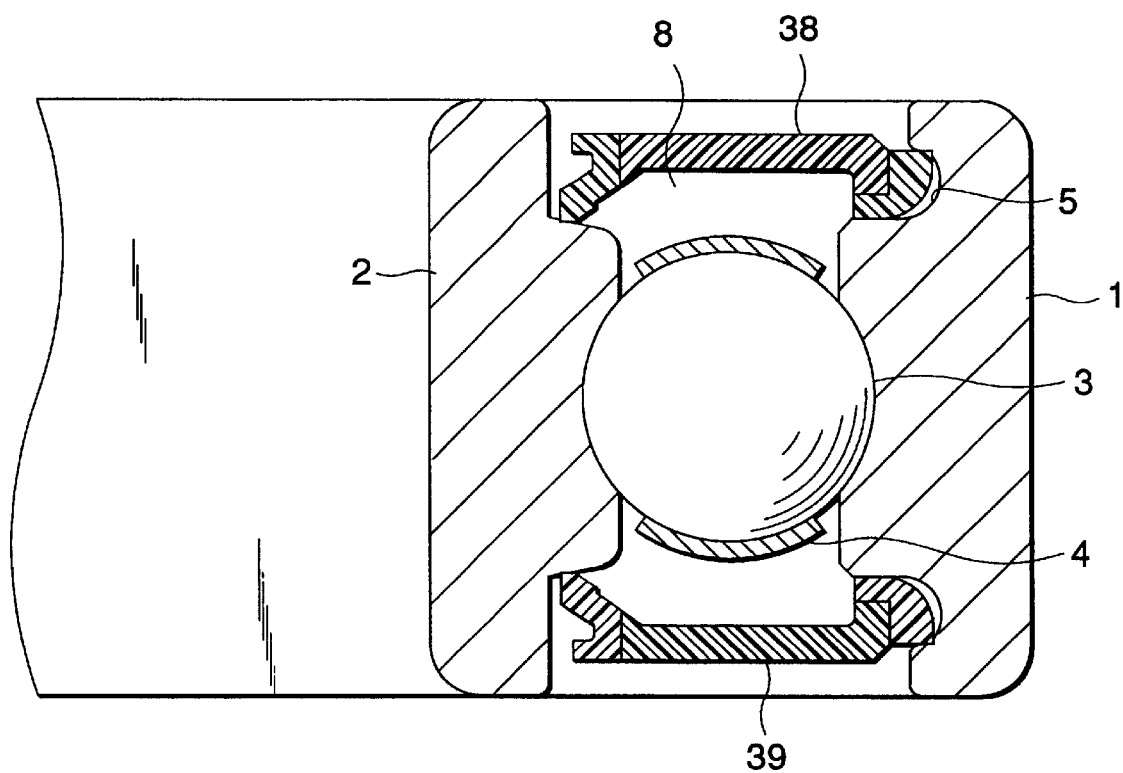
FIG. 16 is a half cross sectional view of a rolling bearing in which a seal according to a fifth modification of the second embodiment is fitted.
Figure 17:
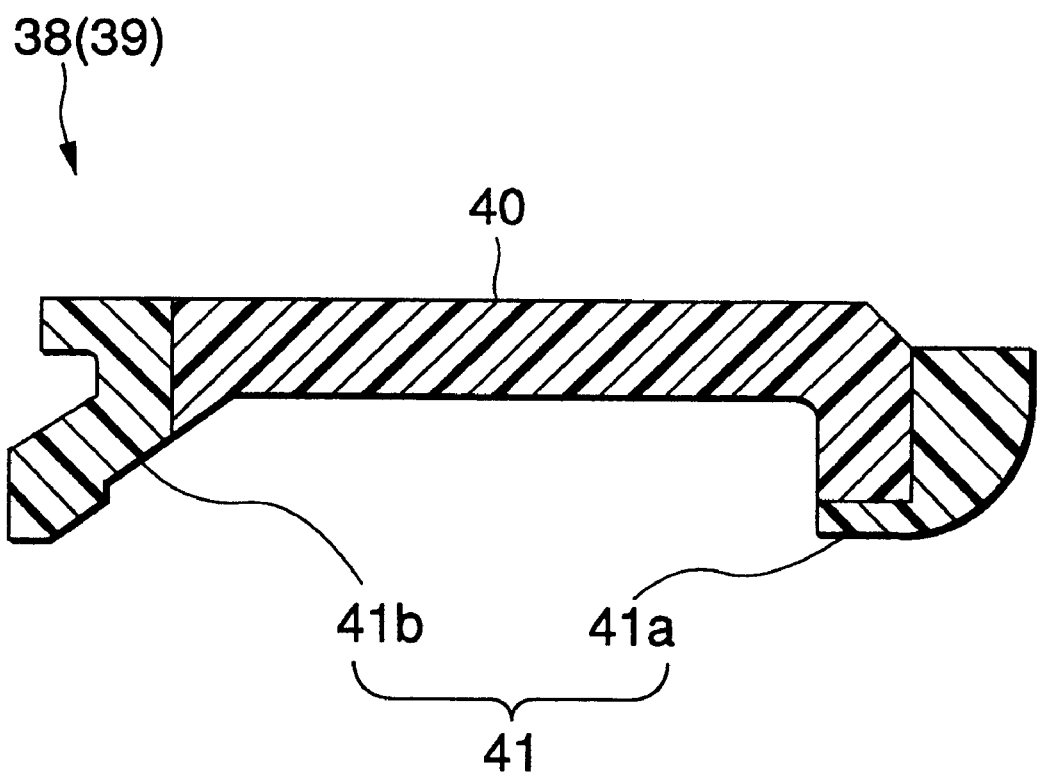
FIG. 17 is a cross sectional view of the seal of FIG. 16.

FIG. 16 is a half cross section of a rolling bearing with a seal according to a fifth modification to the second embodiment of the present invention fitted therein, in which seals 38 and 39 are fitted into respective annular seal grooves 5 of the outer race 1, with their inner peripheral end being in light contact with the inner race 2. As shown in FIG. 17, the seal 38 (or 39) has a flexible resin portion 41 bonded to both the inner and outer peripheral ends of a rigid resin portion 40. In detail, the flexible resin portion 41 is composed of a first flexible resin portion 41a shaped similarly to the examples shown in FIGS. 12(b) and (c) and a second flexible resin portion 41b having a recessed shape. The first flexible resin portion 41a is heat-fusion bonded to the outer peripheral end of the rigid resin portion 40, while the second flexible resin portion 41b is heat-fusion bonded to the inner peripheral end of the rigid resin portion 40 to serve as a lip at which the seal 38 (or 39) is brought into light contact with the inner race 2.

Figure 18A:
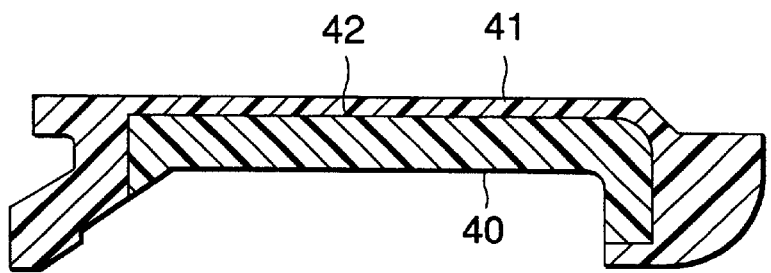
FIGS. 18(a) to (e) are cross sectional views showing a sixth modification to the second embodiment.
Figure 18B:
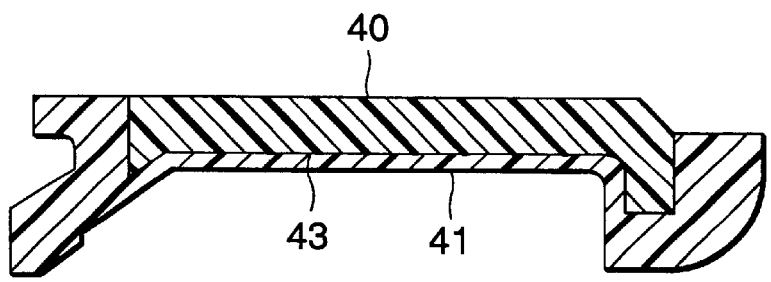
Figure 18C:
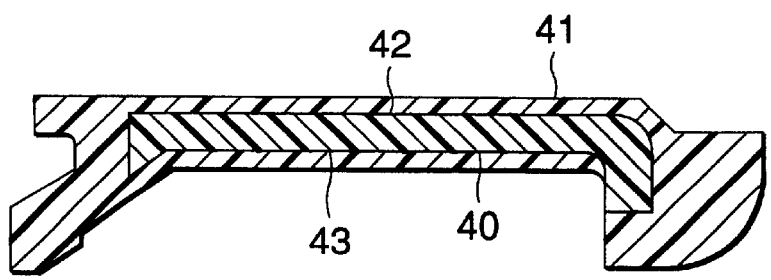

FIGS. 18(a) to (e) show cross sections of seals according to a sixth modification to the second embodiment. In the sixth modification, which is an addition of a further modification to the fifth modification, the rigid resin portion 40 is covered with the flexible resin portion 41 comprising a portion connecting the first and second flexible resin portions. FIG. 18(a) shows an example in which the flexible resin portion 41 covers the upper side 42 of the rigid resin portion 40; FIG. 18(b) shows that the former covers the lower side 43 of the latter; and FIG. 18(c) shows that the former covers both the upper and lower sides of the latter. Since the first and second flexible resin portions are thus extended and connected, the joint surface area between the rigid resin portion 40 and the flexible resin portion 41 increases to ensure the adhesion therebetween. This modification is also advantageous in that the mold design can be simplified.

Figure 18D:
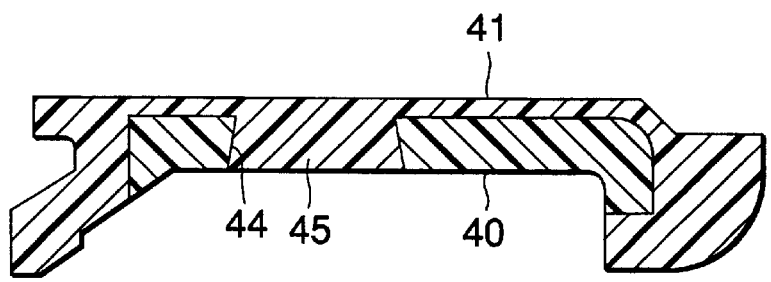
Figure 18E:
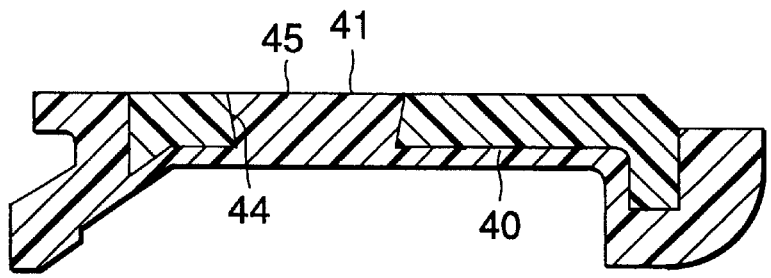
Figure 19A:
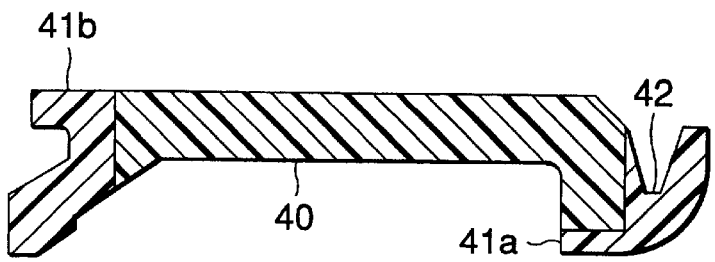
FIGS. 19(a) to (f) are cross sectional views showing a seventh modification to the second embodiment.
Figure 19B:
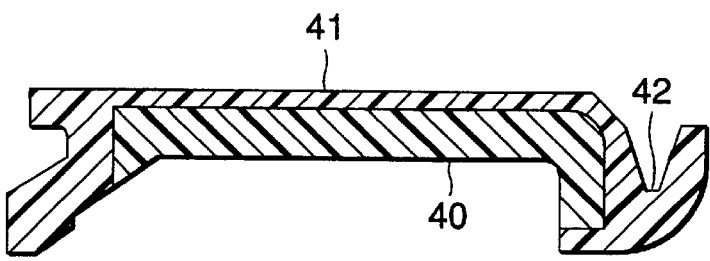
Figure 19C:
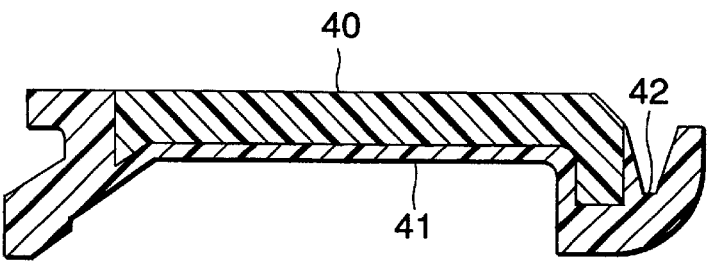
Figure 19D:
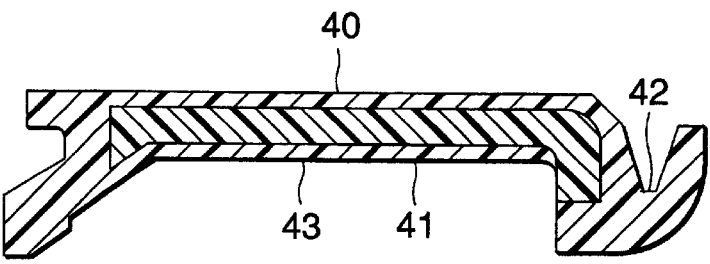
Figure 19E:
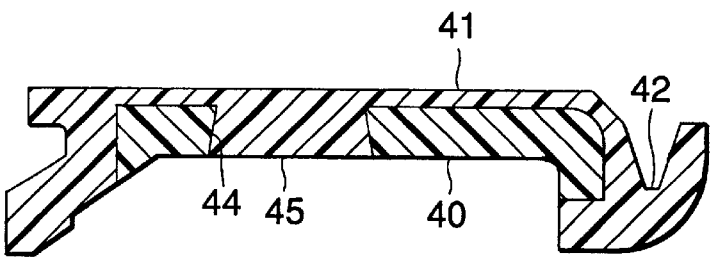
Figure 19F:
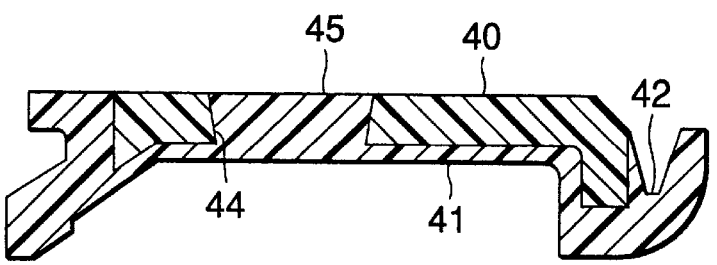

The seals shown in FIGS. 18(d) and (e) additionally have a protrusion 45 with tapering 44 as a part of the flexible resin portion 41. The tapered protrusion 45 exhibits an anchor effect to provide further ensured adhesion of the two resin portions 40 and 41 so as to prevent the two portions from separating.

FIGS. 19(a) to (f) are cross sections showing a seventh modification of the second embodiment, in which a V-cut 42 is made in the part corresponding to the first flexible resin portion 41a of the seals shown in FIGS. 17 and 18(a) to (d) in the same manner as shown in FIGS. 13(a) to (d) and 14(a) to (d).

Figure 20:
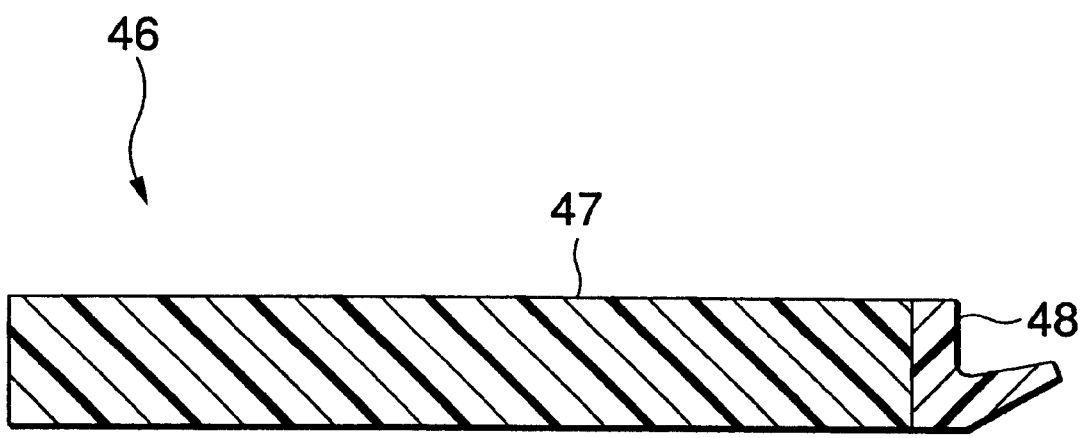
FIG. 20 is a cross sectional view showing an eighth modification to the second embodiment.

FIG. 20 is a cross section showing an eighth modification to the second embodiment, which is designed to cope with a rolling bearing having a reduced thickness. That is, a seal 46 is composed of a rigid resin portion 47 having an almost rectangular cross section to which a flexible resin portion 48 having an almost V-shape cross section is fusion bonded.

The modifications made to the first embodiment also apply to the second embodiment for preference. More specifically, the modifications shown in FIGS. 5(a) to (c) and FIG. 6(a) can be made to the second embodiment to increase the joint surface area, which is effective to bring about improved adhesion as in FIGS. 14(a) to (d). The modification shown in FIGS. 6(b) or (c) can be made to manifest an anchor effect thereby to make the adhesion firmer as in FIG. 15(a) or (b). Further, the modifications shown in FIGS. 3, 6(d) or 7(a) to (c) can be made to the second embodiment to provide seals that are protected against separation between the flexible resin portion and the rigid resin portion and also against creep as in the first embodiment.

Furthermore, the modification shown in FIGS. 8(a) to (d) made to the first embodiment can apply to the second embodiment for the specific use as described above with reference to the eighth modification.

The present invention will now be illustrated in greater detail by way of Examples.

EXAMPLE 1

A combination of a polyester TPE (Pelprene S-9001, produced by Toyobo Co., Ltd.) or a polyamide TPE (UBE.PAE 601, produced by Ube Industries, Ltd.) as a flexible resin material, and nylon 6,6 (Ultramid A3HG5, produced by BASF Engineering Plastic K.K.) as a rigid resin material was two-color injection molded to prepare a specimen for tensile strength measurement under the following molding conditions. For comparison, a, specimen was made solely from each of the same polyester TPE: and polyamide TPE as used above.

Molding Conditions

Specimen: JIS Z 2201 No. 1 specimen

Injection molding machine: two-color molding machine, Model DC40E manufactured by Nissei Jushi Kogyo K.K.)

Mold temperature: 80° C.

Molten resin temperature:

Polyester TPE: 245° C.

Polyamide TPE: 245° C.

Nylon 6,6: 290° C.

Figure 21:
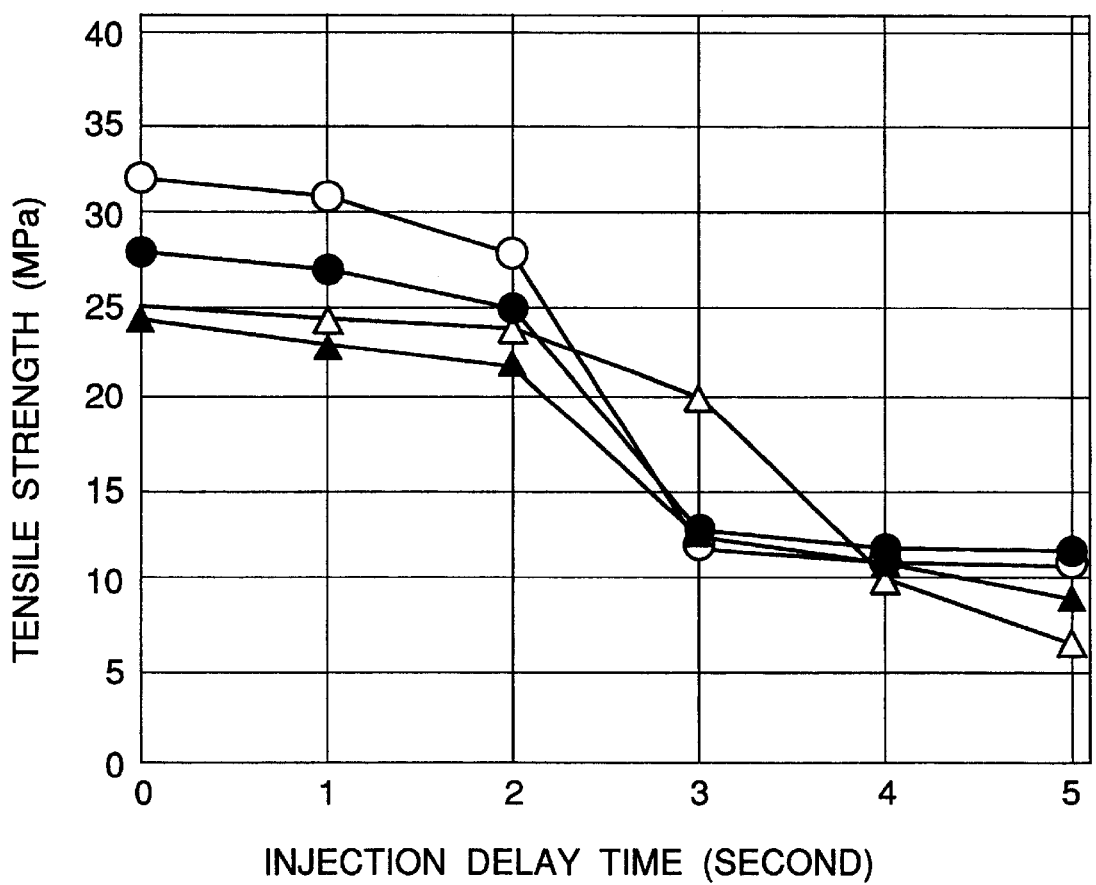
FIG. 21 is a graph showing the relationship of tensile strength vs. delay in two-color molding of Example 1.

The results of tensile strength measurement on the specimens are graphed in FIG. 21, in which the injection delay time (sec) is plotted as abscissa, and the tensile strength (MPa) as ordinate. In the graph, solid circles indicate the polyester TPE-nylon 6,6 combination; solid triangles the polyamide TPE-nylon 6,6 combination; hollow circles the polyester TPE alone; and hollow triangles the polyamide TPE, alone, respectively.

As is apparent from FIG. 21, a heightened bonding strength was obtained when two-color injection molding was conducted with a short delay. In particular, when the delay was within 2 seconds, a tensile strength was 22 MPa or higher, which is comparable to that of the specimen made of the polyester TPE or the polyamide TPE alone.

A pairs of seals 6 and 7 having the cross section of FIG. 3 (outer diameter D: about 11 mm; thickness T of the sealing part: 0.3 mm) were prepared in the same manner as described above and fitted into a miniature ball bearing (JIS No. 695; inner diameter: 5 mm; outer diameter: 13 mm; width: 4 mm). An ester type low-viscosity lubricating oil (WINSOR L-245X, produced by Witco Co.) was sealed into the annular space 8 (see FIG. 1). The roll bearing thus prepared was subjected to a continuous rotation test at a temperature of about 50° C. for 90 days. It was confirmed as a result that the seals had satisfactory sealing properties, suffering from neither leakage of the lubricating oil nor entering of outside dust.

EXAMPLE 2

A combination of a flexible resin material selected from a polyester TPE (Pelprene P150B, produced by Toyobo Co., Ltd.; melting point: 215° C.; hereinafter referred to as polyester TPE (1)), a polyamide TPE (Pebax 5533SNO1, produced by Toray Industries, Inc.; melting point: 168° C.; hereinafter referred to as polyamide TPE (1)), and another polyamide TPE (Pebax 5562MNO1, produced by Toray Industries, Inc.; melting point: 120° C., hereinafter referred to as polyamide TPE (2)) and a rigid resin material selected from PBT containing an ester group (—CO—O—) (Duranex 3300, produced by Polyplastics Co., Ltd.; melting point: 224° C.), nylon 6,6 containing an amido group (—CO—NH—) (Ultramid A3HG5, produced by BASF Engineering Plastic K.K.; melting point: 260° C.), an aromatic polyamide resin containing an amido group (Arlen AA330, produced by Mitsui Chemical Co., Ltd.; melting point: 320° C.), and a polyphenylene sulfide resin (hereinafter abbreviated as PPS) which does not contain an ester group nor an amido group and in which phenyl groups are linked via sulfur (S) (Fortron 1140A4, produced by Polyplastics Co., Ltd.; melting point: 280° C.) was insert molded to prepare a specimen for measurement of tensile strength. Insert molding was carried out as follows. A first material was injection molded by use of an in-line screw injection machine (SIM4749, manufactured by Technoplus K.K.) to prepare a dumbbell specimen (No. 3 specimen of JIS K 6301). The dumbbell specimen was cut into halves, and a half was placed in the cavity of a mold as an insert. Then, a second material was injected into the mold to prepare a specimen for measuring bonding strength.

Polyester TPE (1), polyamide TPE (1) and (2), and PBT were used as a first material, and polyester TPE (1), PBT, nylon 6,6, aromatic polyamide resin, and PPS were used as a second material. The first material-second material combinations are shown in Table 2 below. For reference, test specimens were prepared from each of the first materials.

The tensile strength was measured at 23° C. according to JIS K 7113.

The results obtained are shown in Table 2 together with the resin temperature of the second material.

TABLE 2

| | Tensile Strength (Mpa) | | | | |
|---|---|---|---|---|---|
| | First Material (Melting Point) | | | | Resin |
| | Polyester TPE (1) (215° C.) | Polyamide TPE (1) (168° C.) | Polyamide TPE (2) (120° C.) | PBT (224° C.) | Temp. (° C.) |
| Second Material (Melting Point) | | | | | |
| Polyester TPE (1) (215° C.) | 24 | | | 10 | 225 |
| | 28 | | | 60 | 245 |
| PBT (224° C.) | 27 | 5 | 3.5 | | 250 |
| Nylon 6,6 (260° C.) | 3 | 25 | 25 | | 285 |
| Aromatic | 2.5 | 24 | 26* | | 345 |

TABLE 2-continued

| | Tensile Strength (Mpa) | | | | Resin |
|---|---|---|---|---|---|
| | First Material (Melting Point) | | | | Temp. |
| | Polyester TPE (1) (215° C.) | Polyamide TPE (1) (168° C.) | Polyamide TPE (2) (120° C.) | PBT (224° C.) | (° C.) |
| Polyamide Resin (320° C.) | | | | | |
| PPS (280° C.) | 6 | 4 | | | 320 |
| None | 36 | 50 | 50 | | |

Note:
*Considerable deformation occurred at the joint.

As can be seen from Table 2, when a flexible resin material and a rigid resin material that can be fusion bonded together were combined, i.e., polyester TPE-PBT, polyamide TPE-nylon 6,6, and polyamide TPE-aromatic polyamide resin, and when there was a difference of 20° C. or greater between the resin temperature of the second material and the melting point of the first material, satisfactory bonding strength of 20 MPa or higher was obtained whichever flexible or rigid resin material might be used as a first material or a second material. Specifically, when a flexible resin material and a rigid resin material are heat fusion bonded, with the resin temperature of the second material being set within a prescribed range (i.e., 5° to 200° C. higher than the melting point of the first: material), the resulting molded article is comparable in bonding strength to the molded article obtained by using polyester TPE (1) (flexible resin material) as both first and second materials. Although the tensile strength of the molded article obtained from the combination of two different resin materials is about half of that of the molded article prepared from the first material alone, it is still sufficient for use as a seal for rolling bearings.

To the contrary, in using a combination of a flexible resin material and a rigid resin material which have no common functional group, i.e., polyester TPE (1)-nylon 6,6, polyester TPE (1)-aromatic polyamide resin, polyester TPE (1)-PPS;, polyamide TPE (1)-PPS, or polyamide TPE (2)-PBT, desired heat fusion does not occur, resulting in insufficient bonding. It turned out that the molded articles prepared from these combinations suffer from separation between the flexible resin portion and the rigid resin portion on application of slight pressure.

Where the combination of PBT-polyester TPE (1) was used with the second material resin temperature set at 225° C., the tensile strength was as low as 10 MPa. This seems to be because the melting point of PBT as a first material is 224° C. whereas the resin temperature of polyester TPE (1) as a second material is 225° C., giving a temperature difference of only 1° C. The resin temperature of the second material and the melting point of the first material being so close, the re-melting of the first material (PBT) might be insufficient for obtaining firm adhesion. In this case, the tensile strength could be increased to 26 MPa by elevating the resin temperature of the second material (polyester TPE (1)) up to 245° C. However, when the resin of higher melting point is chosen as a first material, the resin temperature of the second material must be set fairly higher than the melting point thereof, which can cause thermal deterioration of the second material. Therefore, it is generally preferred that, of a flexible resin material and a rigid resin material, the one having a higher melting point be used as a second material.

The combination of polyamide TPE (2) and aromatic polyamide resin showed a satisfactory tensile strength of 26 MPa but underwent considerable deformation at the joint. The melting point of the aromatic polyamide resin used as a second material is as high as 320° C., so is the resin temperature of the second material set at such a high temperature as 345° C., which temperature is higher than the melting point of the first material (120° C.) by 200° C. or more. It seems that the first material re-melted in not only the surface area in contact with the second material but other areas and, as a result, it was difficult for the part made of the first material to retain its shape. That is, the resin, temperature of the second material was too higher than the melting point of the first material, causing considerable deformation at the joint.

EXAMPLE 3

A combination of a flexible resin material selected from polyester TPE and polyamide TPE and a rigid resin material selected from PBT, nylon 6, nylon 6,6, nylon 4,6, nylon 11, and an aromatic polyamide resin was insert molded in the same manner as in Example 2 to prepare specimens. Deformation at the joint, deterioration of the resin materials, and the tensile strength of the resulting specimens were evaluated.

In addition to the resin materials shown in Table 2 the following resin materials were used.

Polyester TPE (2): Pelprene P40H produced by Toyobo Co., Ltd.; melting point: 172° C.

Nylon 6: Amilan CM1011G30, produced by Toray Industries, Ltd.; melting point: 220° C.

Nylon 4,6: Nylon 46 TS200F6, produced by Japan Synthetic Rubber Co., Ltd.; melting point: 295° C.

Nylon 11: Nylon 11 BZM30, produced by Toray Industries, Ltd.; melting point: 187° C.

Figure 22:
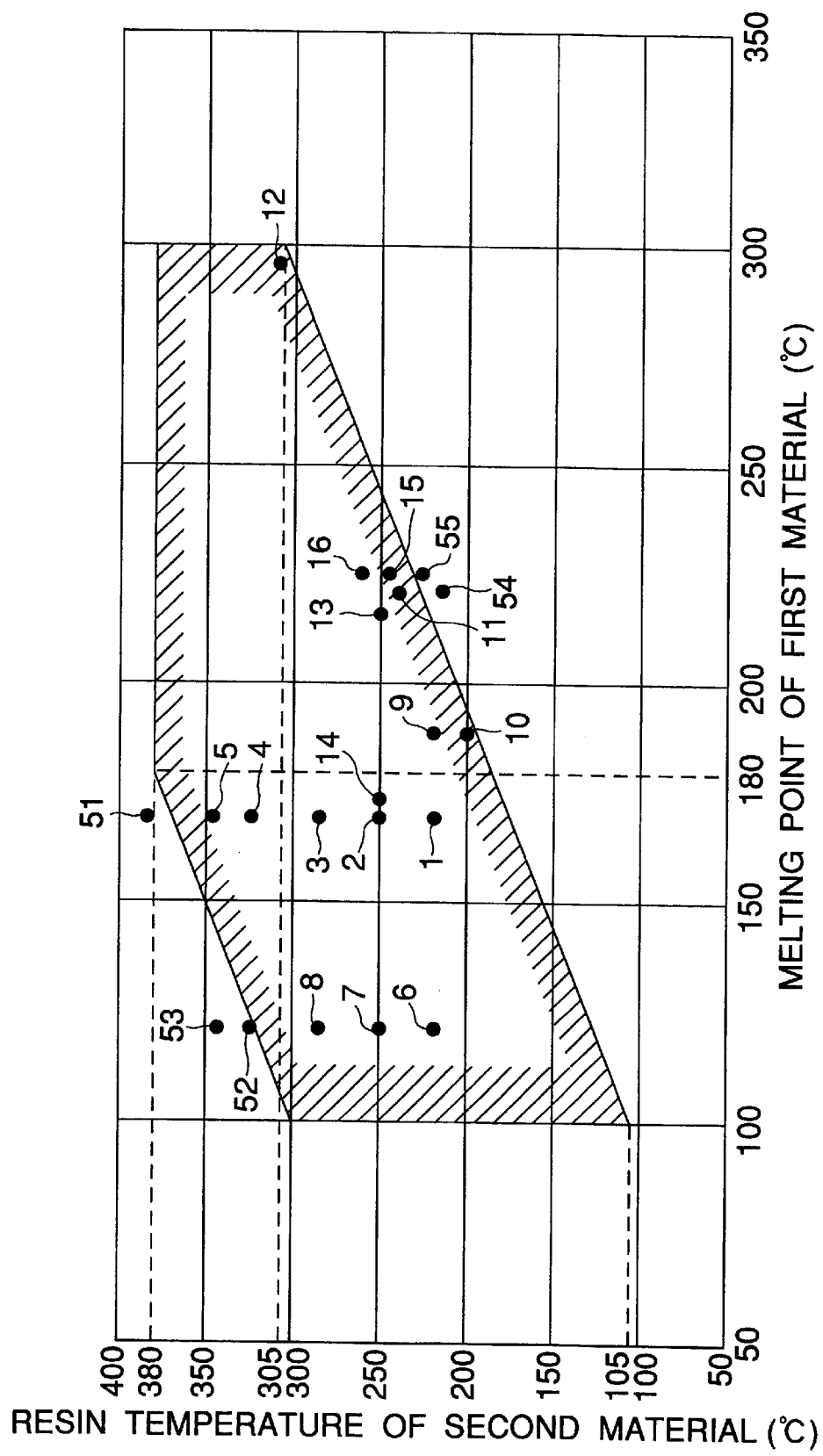
FIG. 22 is a plot showing the relationship between the melting point (or softening point) of a first material and the resin temperature of a second material in insert molding of Example 2.

In Table 3 below are shown combinations of a first material and a second material, the melting points of these resin materials, and the resin temperature of the second material. FIG. 22 shows the relationship between the melting point of the first material and the resin temperature of the second material in Run Nos. 1 to 16 according to the present invention and Comparative Run Nos. 51 to 55.

TABLE 3

| Run No. | First Material Kind of Resin | M.P. (° C.) | Second Material Kind of Resin | Resin Temp. (° C.) | M.P. (° C.) |
|---|---|---|---|---|---|
| 1 | polyamide TPE (1) | 168 | nylon 11 | 220 | 187 |
| 2 | polyamide TPE (1) | 168 | nylon 6 | 250 | 220 |
| 3 | polyamide TPE (1) | 168 | nylon 6,6 | 285 | 260 |
| 4 | polyamide TPE (1) | 168 | nylon 4,6 | 325 | 295 |
| 5 | polyamide TPE (1) | 168 | aromatic polyamide | 345 | 320 |
| 6 | polyamide TPE (2) | 120 | nylon 11 | 220 | 187 |
| 7 | polyamide TPE (2) | 120 | nylon 6 | 250 | 220 |
| 8 | polyamide TPE (2) | 120 | nylon 6,6 | 285 | 260 |
| 9 | nylon 11 | 187 | polyamide TPE (1) | 220 | 168 |
| 10 | nylon 11 | 187 | polyamide TPE (2) | 200 | 120 |
| 11 | nylon 6 | 220 | polyamide TPE (1) | 240 | 168 |
| 12 | nylon 4,6 | 295 | polyamide TPE (2) | 310 | 168 |
| 13 | polyester TPE (1) | 215 | PBT | 250 | 224 |
| 14 | polyester TPE (2) | 172 | PBT | 250 | 224 |
| 15 | PBT | 224 | polyester TPE (1) | 245 | 215 |
| 16 | PBT | 224 | polyester TPE (2) | 260 | 172 |
| 51 | polyamide TPE (1) | 168 | aromatic polyamide | 385 | 320 |
| 52 | polyamide TPE (2) | 120 | nylon 4,6 | 325 | 295 |
| 53 | polyamide TPE (2) | 120 | aromatic polyamide | 345 | 320 |
| 54 | nylon 6 | 220 | polyamide TPE (2) | 215 | 120 |
| 55 | PBT | 224 | polyester TPE (1) | 225 | 215 |

As shown in FIG. 22, in Run No. 51, in which the resin temperature of the second material was as high as 385° C., not only was the first material deformed but the second material itself suffered considerable deterioration. That is, the resin temperature of the aromatic polyamide resin (rigid resin material) as a second material was higher than the melting point of polyamide TPE (1) (flexible resin material) (158° C.) as a first material by 200° C. or more. While the difference between the resin temperature of the aromatic polyamide resin and its melting point (320° C.) was not more than 150° C., the resin temperature was not less than 380° C. As a result, the insert made of polyamide TPE (1) obtained in first molding step 28 failed to retain its shape, and the aromatic polyamide resin itself underwent remarkable thermal deterioration.

In Run Nos. 52 and 53, the resin temperature of the second material (nylon 4,6 or aromatic polyamide resin) was within the range of 10° C. to 150° C., higher than its melting point and also not higher than 380° C. Notwithstanding, considerable deformation of the first material was observed. This is believed to be because the resin temperature was higher than the melting point of the first material (polyamide TPE (2)) (120° C.) by a difference of larger than 200° C.

In Run No. 54, the resin temperature of polyamide TPE (2) (flexible resin material) as a second material was set at 215° C., which is lower than the melting point of nylon 6 (rigid resin material) (220° C.) used as a first material, so that the first material did not re-melt. In Run No. 55, the difference between the resin temperature of polyamide TPE (1) (flexible resin material) as a second material (225° C.) and the melting point of PBT (rigid resin material) as a first material (224° C.) was smaller than 5° C. so that re-melting of the first material was insufficient. As a result, both runs resulted in insufficient bonding between the first and second materials.

In any of Run Nos. 1 to 16 according to the present invention which come in the area surrounded by slant lines in FIG. 22, the melting point of the first material is lower than that of the second material; the first material is selected from resin materials whose melting point falls within the range of from 100 to 300° C.; the resin temperature of the second material is set higher than the melting point of the first material by 5 to 200° C.; and the resin temperature of the second material is set higher than the melting point of its own by 10 to 150° C. and yet not higher than 380° C. Therefore, there were obtained molded articles in which the first and second materials were firmly bonded to each other exhibiting a tensile strength of 20 MPa or higher without inducing deformation of the first material nor thermal deterioration of the second material.

EXAMPLE 4

A pairs of seals 6 and 7 having the design of FIG. 10 (outer diameter D': about 11 mm; thickness T of the sealing part: 0.3 mm) were prepared from polyester TPE (1) (Pelprene P150B) as a flexible resin material and PBT (Duranex 3300) as a rigid resin material. The resulting seals were fitted into the same miniature ball bearing as used in Example 1 (JIS No. 695), and an ester type low-viscosity lubricating oil (WINSOR L-245X, produced by Witco Co.) was sealed into the annular space 8 (see FIG. 1). The roll bearing thus prepared was subjected to a continuous rotation test at a temperature of about 50° C. for 90 days. It was confirmed as a result that the seals exhibited satisfactory sealing performance with no leakage of the lubricating oil nor entering of outside dust.

As described above, the seal for a rolling bearing according to the present invention comprises a flexible resin portion which comes into contact with at least one of the seal grooves on inner and outer races and a rigid resin portion which is more rigid than the flexible resin portion, wherein the rigid resin portion and the flexible resin portion are fusion bonded together to form an integral body. Because of the fusion bonding, the rigid resin portion and the flexible resin portion are bonded extremely firmly. Therefore, even when thermal strain is imposed due to temperature change, separation of the two resin portions, which might have arisen from the difference between them in linear expansion coefficient, can be avoided, and even the seals are used for an extended period of time, reduction in sealing properties due to deformation does not occur.

The present invention thus provides a seal for rolling bearings which takes full advantage of the characteristics possessed by each of the flexible resin material and the rigid resin material and which exhibits satisfactory sealing properties independently of the working environment.

While the invention has been described in detail and with reference to specific embodiments thereof, it will be apparent to one skilled in the art that various changes and modifications can be made therein without departing from the spirit and scope thereof.

What is claimed is:

1. A seal for a rolling bearing comprising:
    a flexible resin portion which comes into contact with a seal groove on at least one of inner and outer races of a rolling bearing, and
    a rigid resin portion which is more rigid than said flexible resin portion, said rigid resin portion and said flexible resin portion being fusion bonded together into an integral body,
    wherein a resin constituting the flexible resin portion has a melting point or a softening point of from 100 to 300° C. and a resin constituting the rigid resin portion has a melting point or a softening point higher than the melting point or the softening point of the resin constituting the flexible resin portion;
    wherein a combination of the resin constituting the flexible resin portion and the resin constituting the rigid resin portion is any of a combination of a polyester thermoplastic elastomer and a polyester resin, the combination of a polyamide thermoplastic elastomer and a polyamide resin, or the combination of a polyolefin thermoplastic elastomer and a polyolefin resin; and
    wherein the flexible resin portion covers at least a part of a surface of the rigid resin portion facing in a direction of the side of the seal which is press fitted into the seal groove.

2. The seal of claim 1, wherein the rigid resin portion is substantially annular and has outer and inner peripheral side walls, and wherein the flexible resin portion is provided on at least one of the outer and inner peripheral side walls, is to be press fitted into at least one seal groove of the outer race and inner race, and is jointed to the at least one of the outer and inner peripheral side walls of the rigid resin portion and the surface of the rigid resin portion facing in the direction of press fitting of the seal into the seal groove.

3. The seal of claim 2, wherein the flexible resin portion is provided on the outer peripheral side wall of the rigid resin portion and is jointed to the outer peripheral side of the rigid resin portion and the surface of the rigid resin portion side facing in the direction of press fitting of the seal into a seal groove of the outer race.

4. A process of producing a seal for a rolling bearing comprising a flexible resin portion which comes into contact with at least one of the seal grooves on inner and outer races of a rolling bearing and a rigid resin portion which is more rigid than said flexible resin portion,
    wherein said rigid resin portion and said flexible resin portion are fusion bonded together into an integral body,
    wherein a resin constituting the flexible resin portion has a melting point or a softening point of from 100 to 300° C. and a resin constituting the rigid portion has a melting point or a softening point higher than the melting point or the softening point of the resin constituting the flexible resin portion;
    wherein the combination of the resin constituting the flexible resin portion and the resin constituting the rigid resin portion is a combination of a polyester thermoplastic elastomer and a polyester resin, a combination of a polyamide thermoplastic elastomer and a polyamide resin, or a combination of a polyolefin thermoplastic elastomer and a polyolefin resin; and
    wherein the flexible resin portion covers at least a part of the surface of the rigid resin portion facing in a direction of the side of the seal which is press fitted into the seal groove, comprising:
        molding a first portion, selected from said rigid and flexible portions of said seal, and
        molding a second portion, selected from said rigid and flexible portions of said seal, with the other resin of said flexible resin and said rigid resin such that the first portion and the second portion are integrated,
        wherein molding of the second portion is effected such that a temperature in molding of the resin constituting the second portion is higher than the melting point or softening point of the resin constituting the first portion by 5 to 200° C., and wherein the temperature in molding of the resin constituting the second portion is not more than 380° C. and is higher than the melting point or softening point of the resin constituting the second portion 10° C. to 150° C.

* * * * *